US009163859B2

(12) United States Patent
Prentice

(10) Patent No.: US 9,163,859 B2
(45) Date of Patent: *Oct. 20, 2015

(54) ADJUSTABLE SOLAR PANEL SYSTEM

(71) Applicant: James L. Prentice, North Hills, CA (US)

(72) Inventor: James L. Prentice, North Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/276,092

(22) Filed: May 13, 2014

(65) Prior Publication Data

US 2014/0245672 A1   Sep. 4, 2014

Related U.S. Application Data

(63) Continuation of application No. 14/102,264, filed on Dec. 10, 2013, now Pat. No. 8,813,532, which is a continuation of application No. 13/248,608, filed on Sep. 29, 2011, now Pat. No. 8,601,752.

(51) Int. Cl.
| | |
|---|---|
| *H02B 1/40* | (2006.01) |
| *H02B 1/42* | (2006.01) |
| *F24J 2/52* | (2006.01) |
| *H01L 31/18* | (2006.01) |

(Continued)

(52) U.S. Cl.
CPC .............. *F24J 2/5228* (2013.01); *E04D 3/405* (2013.01); *F24J 2/0427* (2013.01); *F24J 2/5235* (2013.01); *F24J 2/5245* (2013.01); *F24J 2/5249* (2013.01); *F24J 2/5264* (2013.01); *H01L 31/05* (2013.01); *H01L 31/18* (2013.01); *H02S 20/00* (2013.01); *Y02B 10/20* (2013.01); *Y02E 10/44* (2013.01); *Y02E 10/47* (2013.01); *Y02E 10/50* (2013.01); *Y10T 29/49355* (2015.01); *Y10T 29/51* (2015.01); *Y10T 29/5116* (2015.01)

(58) Field of Classification Search
CPC ....... F24J 2/5228; F24J 2/5245; F24J 2/5249; F24J 2/5264; F24J 2/5235; F24J 2/0427; H01L 31/05; H01L 31/18; H02S 20/00; E04D 3/405; Y10T 29/49355; Y10T 29/51; Y10T 29/5116; Y02E 10/44; Y02E 10/47; Y02E 10/50; Y02B 10/20
USPC .................... 52/173.3, 173.1, 200, 202, 208; 126/621–623
See application file for complete search history.

(56) References Cited

U.S. PATENT DOCUMENTS

| | | |
|---|---|---|
| 2,471,490 A | 5/1949 | Mercer |
| 4,299,108 A | 11/1981 | Kato et al. |

(Continued)

FOREIGN PATENT DOCUMENTS

| | | | |
|---|---|---|---|
| CH | 665968 A5 | | 6/1988 |
| JP | 08120625 A | * | 5/1996 |
| JP | 2001064919 A | * | 3/2001 |

*Primary Examiner* — Jeanette E Chapman
(74) *Attorney, Agent, or Firm* — Kelly & Kelley, LLP

(57) ABSTRACT

A solar panel cap and light cap secured to a wall or parapet through the use of a fixed coping and a secured bracket. The secured bracket has a securing plate mechanically attached to a top of the wall and upper and lower extensions extending above and below the top of the wall along its sides. The fixed coping has two vertical supports on either side of a locking channel. The vertical supports are biased or resilient to secure the coping to the secured bracket with the upper extensions providing full contact along the length of the vertical supports. The locking channel is configured to slidably receive a locking insert from a solar panel cap or light cap, each configured to connect to an adjacent cap such that they are electrically coupled.

20 Claims, 17 Drawing Sheets

(51) Int. Cl.
  *E04D 3/40* (2006.01)
  *F24J 2/04* (2006.01)
  *H01L 31/042* (2014.01)
  *H01L 31/05* (2014.01)

(56) References Cited

U.S. PATENT DOCUMENTS

| | | | |
|---|---|---|---|
| 4,716,754 | A | 1/1988 | Youngs |
| 5,239,791 | A * | 8/1993 | Mills et al. .................... 52/58 |
| 5,289,662 | A * | 3/1994 | Castle ........................... 52/287.1 |
| 5,315,853 | A | 5/1994 | Scheiterle |
| 5,425,259 | A | 6/1995 | Coben et al. |
| 5,551,272 | A | 9/1996 | Knudson |
| 5,893,247 | A * | 4/1999 | Hickman et al. ................ 52/300 |
| 5,946,961 | A | 9/1999 | Stone |
| 5,983,691 | A | 11/1999 | Voth et al. |
| 6,148,654 | A | 11/2000 | Jensen et al. |
| 6,981,397 | B2 | 1/2006 | Meyer |
| 7,018,063 | B2 | 3/2006 | Michael et al. |
| 7,230,819 | B2 | 6/2007 | Muchow et al. |
| 7,476,832 | B2 | 1/2009 | Vendig et al. |
| 7,819,114 | B2 | 10/2010 | Augenbraun et al. |
| 8,640,402 | B1 * | 2/2014 | Bilge ........................... 52/173.3 |
| 2004/0148995 | A1 | 8/2004 | Gilbert |
| 2006/0050528 | A1 | 3/2006 | Lyons et al. |
| 2009/0320545 | A1 | 12/2009 | Robins |
| 2011/0138696 | A1 | 6/2011 | Olson et al. |

* cited by examiner

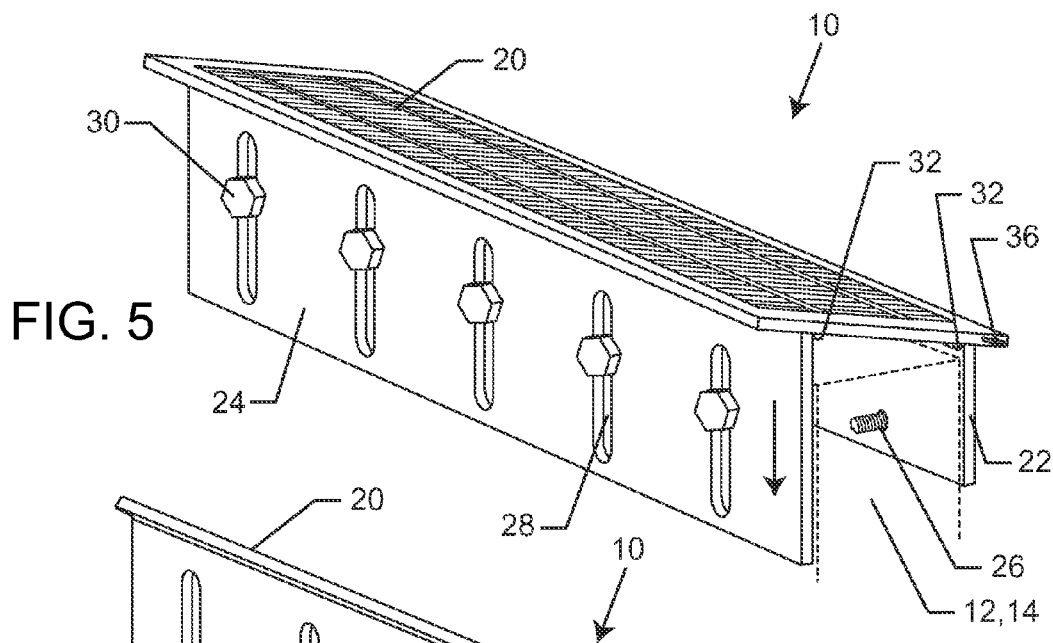
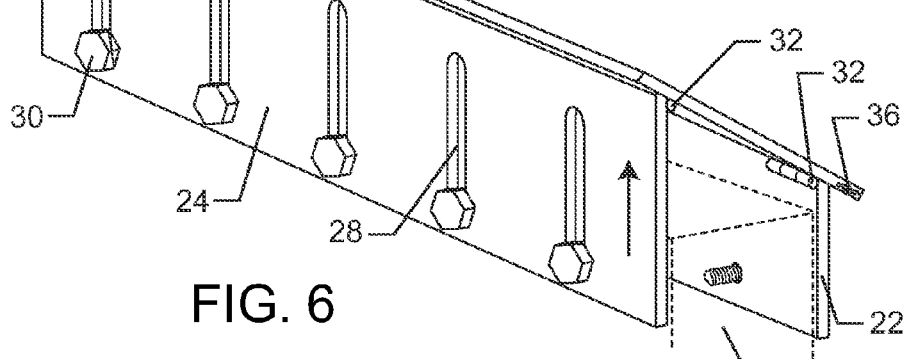
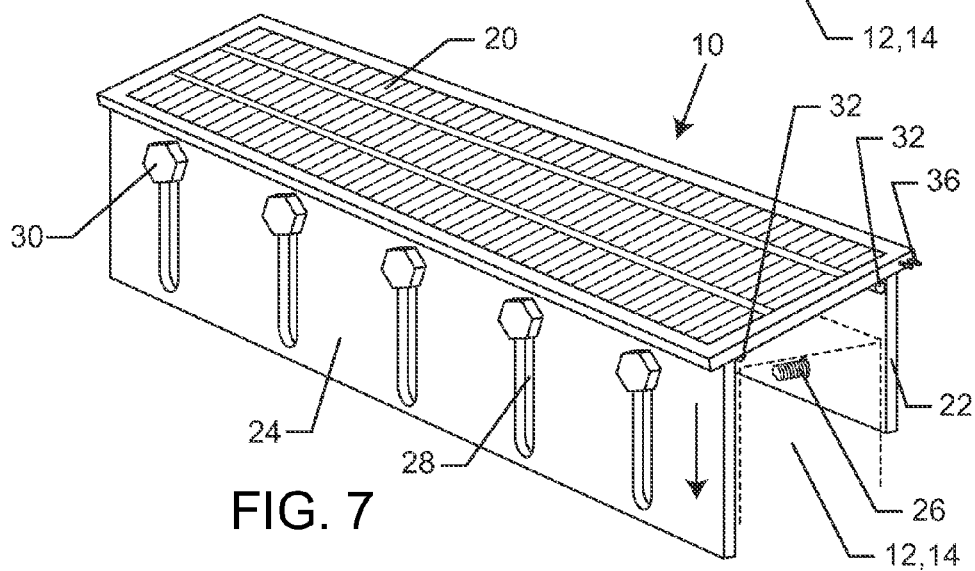

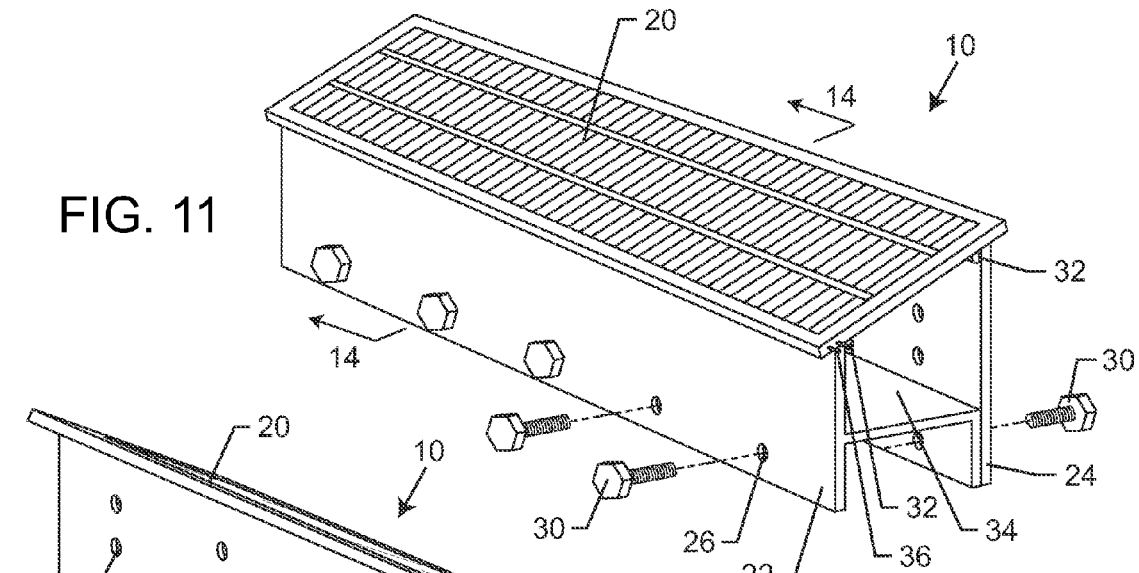
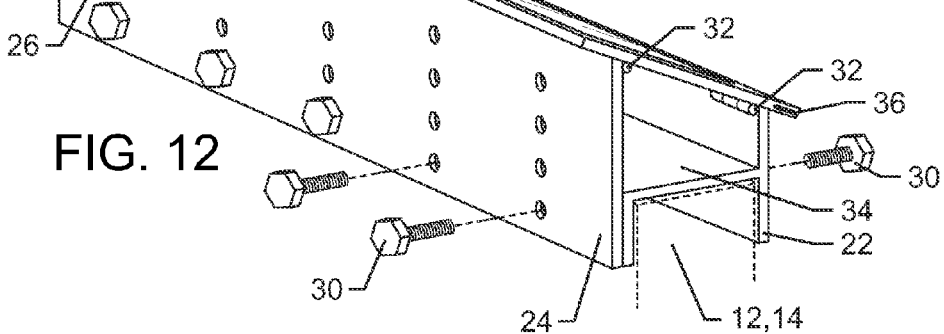
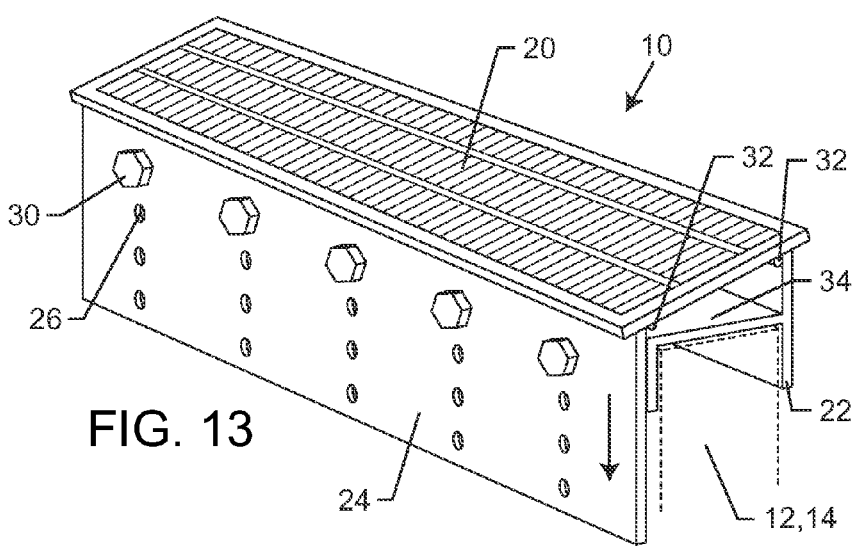

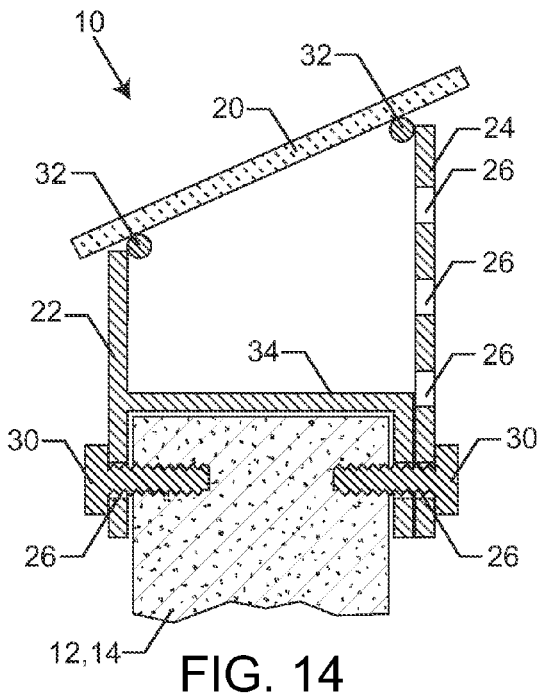
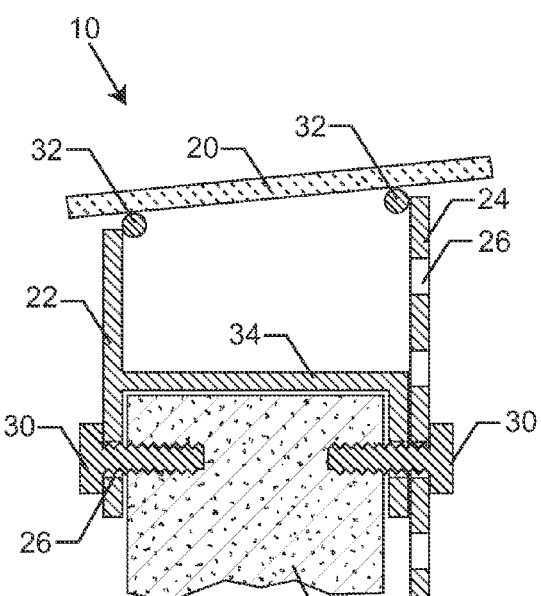
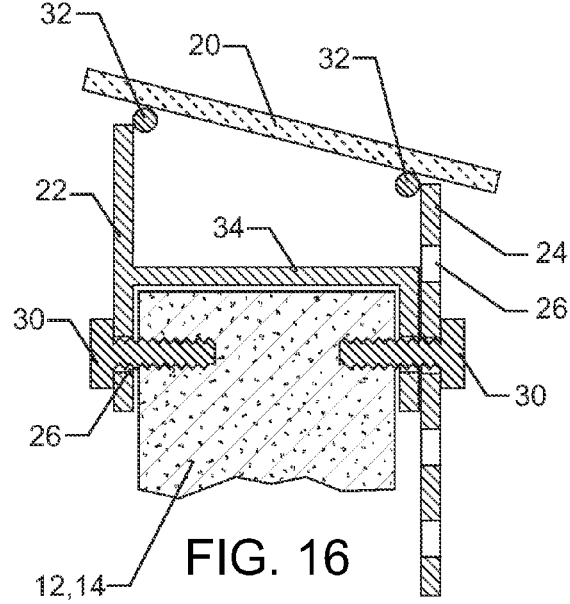

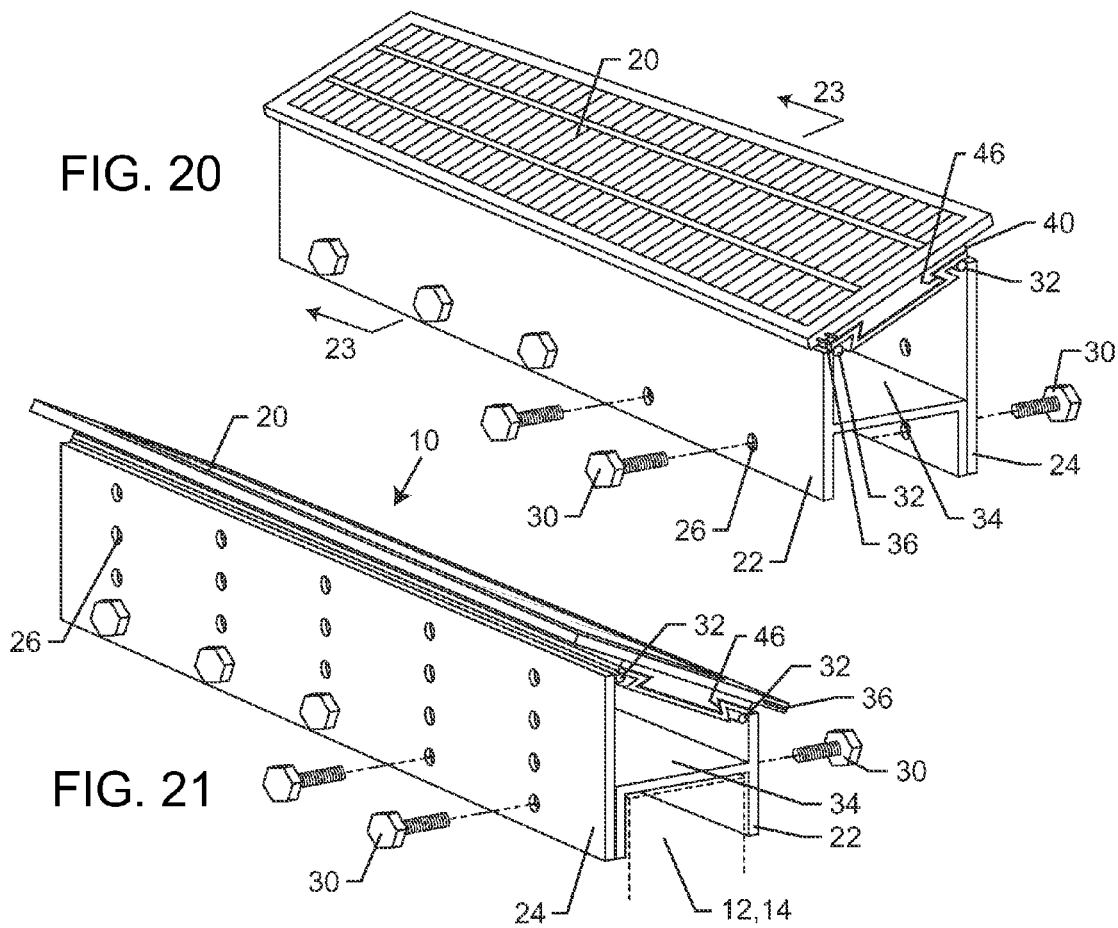
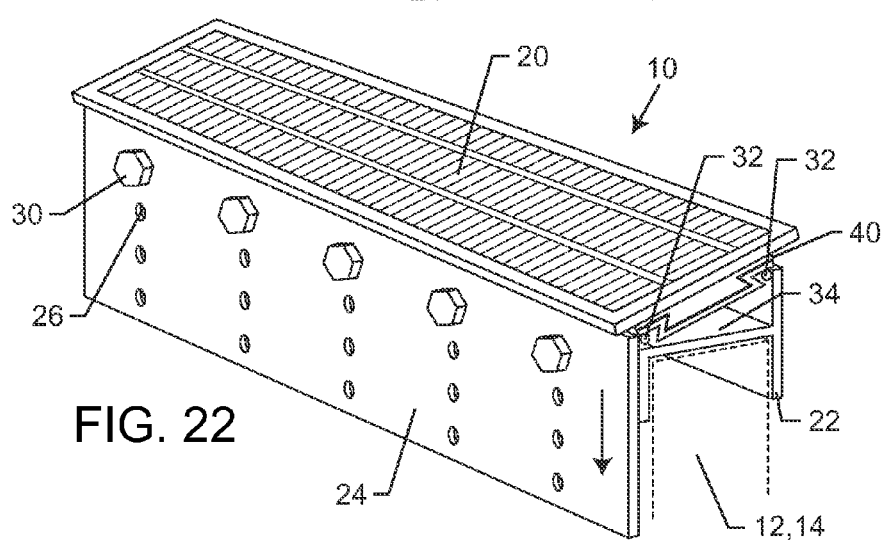

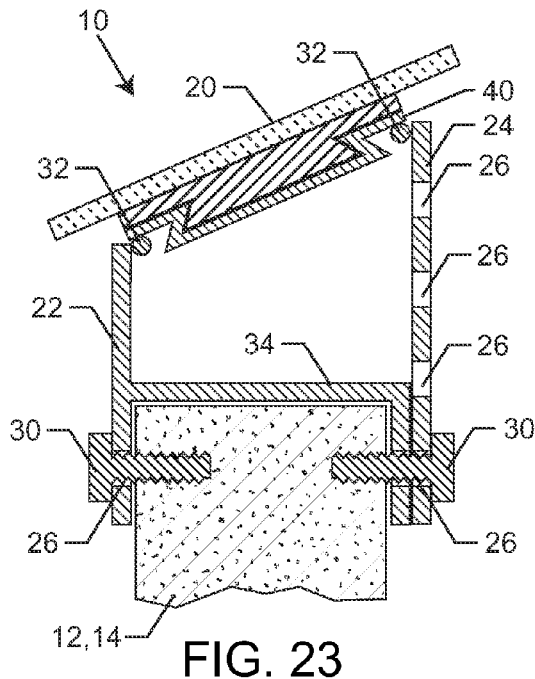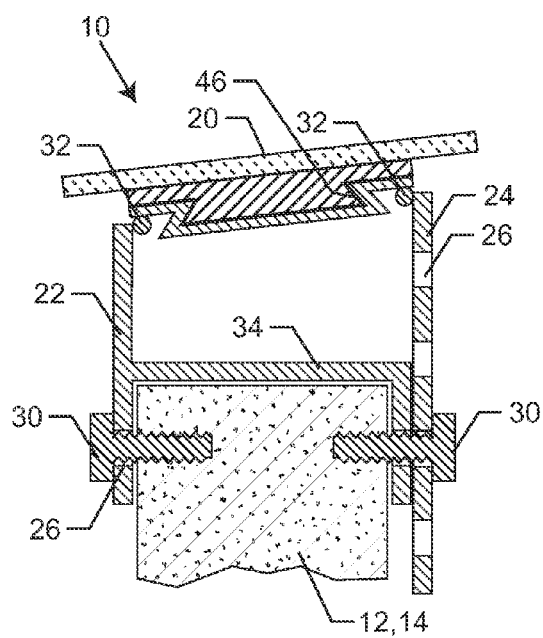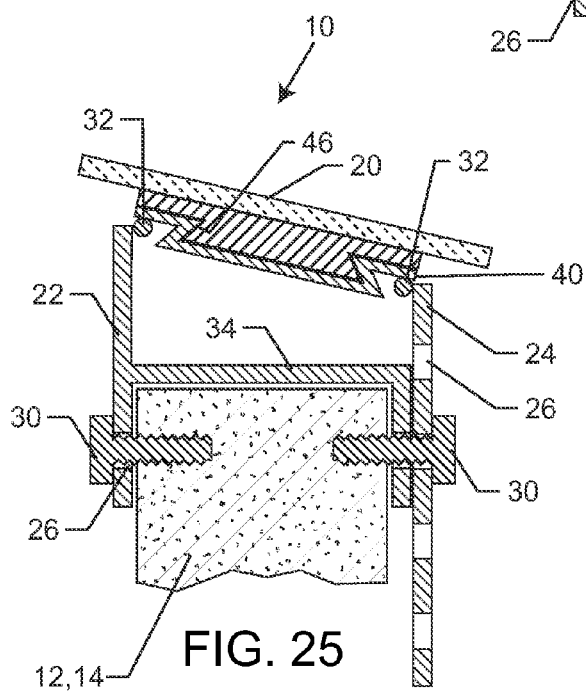

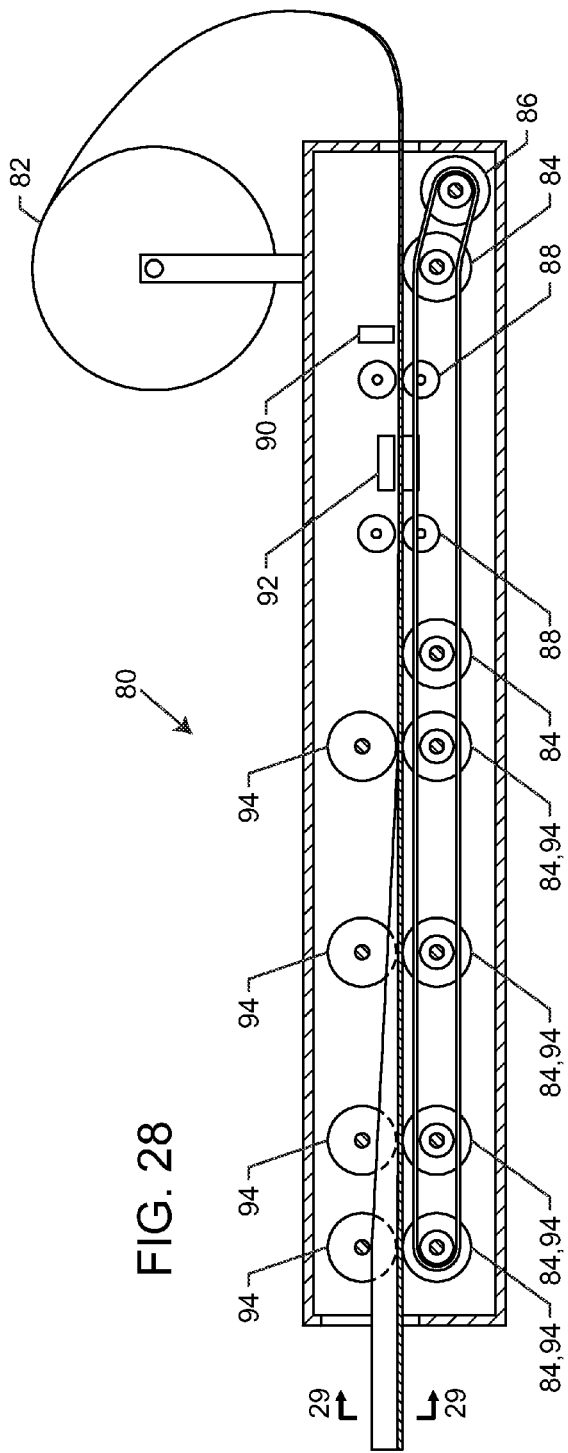
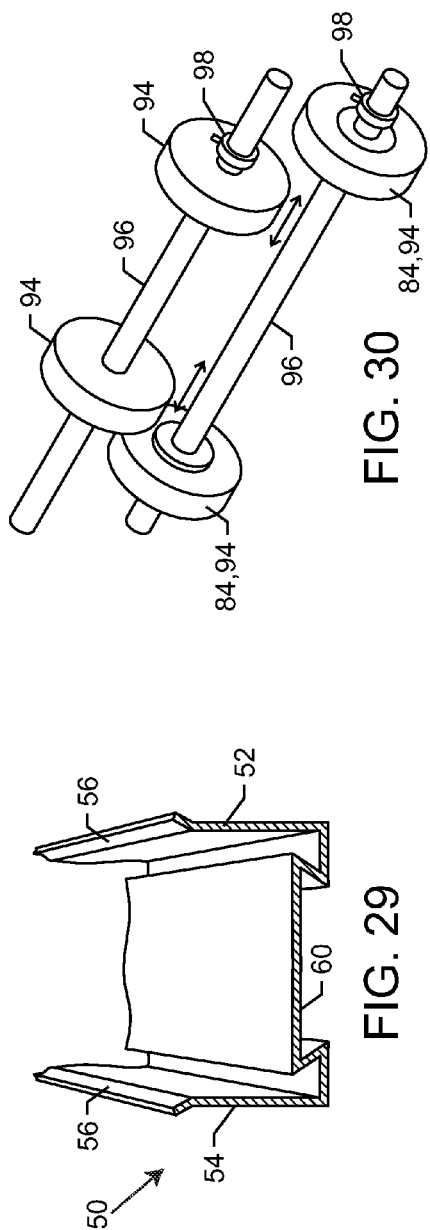
FIG. 28
FIG. 30
FIG. 29

ADJUSTABLE SOLAR PANEL SYSTEM

RELATED APPLICATION

This application is a continuation-in-part of U.S. application Ser. No. 14/102,264, filed on Dec. 10, 2013, which is a continuation-in-part of U.S. application Ser. No. 13/248,608, filed on Sep. 29, 2011, now U.S. Pat. No. 8,601,752.

FIELD OF THE INVENTION

The present invention generally relates to solar panels. More particularly, the present invention relates to an adjustable solar panel system which is securely attachable to a parapet or a wall by a secured bracket and fixed coping for the operation of various electrically powered devices.

BACKGROUND OF THE INVENTION

Many buildings all across the world have a parapet. A parapet is a wall-like barrier at the edge of a roof, terrace, balcony or other structure. When extending above a roof, it may simply be the portion of an exterior wall that continues above the line of the roof surface, or may be a continuation of a vertical feature beneath the roof such as a fire wall or party wall. Historically, parapets were originally used to defend buildings from military attack, but today they are primarily used for preventing the spread of fires or for aesthetic reasons. The word parapet comes ultimately from the Italian parapetto (parare=to cover/defend and petto=breast).

Plain parapets are upward extensions of the wall, sometimes with a coping at the top and corbel below. A parapet may be used to hide a sloping roof or installed exhaust equipment. Alternatively, many firewalls are required to have a parapet, a portion of the wall extending above the roof. The parapet is required to be as fire resistant as the lower wall. It is required to extend at least 30 inches above the roof. If the roof slopes at a rate of 2 in 12 or greater (16.7 percent slope), the parapet shall extend to the same width as any portion of the floor within a fire separation distance where protection of wall openings is required, but in no case shall the height be less than 30 inches (762 mm).

Free standing walls are also common structures found throughout the world. A wall may be built as a retaining wall which is usually supporting an amount of land on one side and preventing it from sliding downward. A free standing wall can also be placed along a highway as a sound barrier or to prevent a traffic accident from going beyond the wall or to prevent the accumulation of traffic noise from becoming a nuisance to nearby residences. Whether it is a wall or a parapet, it is often in a location that receives a substantial amount of sun. This area can be optimized for use producing electricity.

Solar panels use light energy (photons) from the sun to generate electricity through the photovoltaic effect (this is the photo-electric effect). A solar panel (photovoltaic module or photovoltaic panel) is a packaged interconnected assembly of solar cells, also known as photovoltaic cells. The solar panel is used as a component in a larger photovoltaic system to offer electricity for commercial and residential applications. The structural (load carrying) member of a module can either be the top layer (superstrate) or the back layer (substrate). The majority of modules use wafer-based crystalline silicon cells or a thin-film cell based on cadmium telluride or silicon. Crystalline silicon, which is commonly used in the wafer form in photovoltaic (PV) modules, is derived from silicon, a commonly used semi-conductor. Because a single solar panel can only produce a limited amount of power, many installations contain several panels. This is known as a photovoltaic array. A photovoltaic installation typically includes an array of solar panels, an inverter, batteries and interconnection wiring.

Solar panels/arrays are commonly installed on the roof of a residential or commercial property to take advantage of the usable real estate on rooftops. Solar panels are used to generate power for the building they are installed upon and necessarily cover a large amount of surface area to generate enough usable power. Solar panel installation is typically professional installed and is therefore quite labor intensive and expensive.

There are many applications where even a small amount of solar power would be beneficial to provide for landscape lighting, motion sensor lighting, or other general electricity needs which does not require a large and costly solar panel/array installation. Also, there is a need to utilize all the available real estate possible to collect light for solar power whether it is used outside or inside. A parapet or a free standing wall is a common location which can be optimized to produce electricity.

Accordingly, there is a need for an easily installable solar panel to be attached upon a ledge which can be configured to power various electrical needs, such as lighting during the night. The present invention fulfills these needs and provides other related advantages.

SUMMARY OF THE INVENTION

The present invention relates to an adjustable solar panel system for attachment to a parapet or wall. The system includes a secured bracket configured for attachment to the top of the parapet or wall. The secured bracket includes a securing plate that is configured to rest generally flush against a top of the parapet or wall. An edge of the secured bracket includes an upper extension configured to extend above the top of the parapet or wall and a lower extension configured to extend below the top of the parapet or wall. The secured bracket may comprise a single piece where the securing plate extends across the entire width of the top of the parapet or wall. In another embodiment, the secured bracket may comprise one or more pieces configured to attach to a top corner of the parapet or wall. Preferably two separate pieces are attached to opposite top corners of the parapet or wall.

A fixed coping is configured to slip over the secured bracket when it is attached to the wall. The fixed coping preferably has oppositely disposed vertical supports which are configured to extend below the lower extension and be biased against the sides of the parapet or wall. In contrast, the lower extension of the secured bracket may extend below the vertical supports such that the vertical supports are biased against the lower extensions. The fixed coping further includes a locking channel in the upper exposed surface thereof.

A solar panel cap is configured for attachment to the fixed coping. The solar panel cap preferably has a locking insert for slidably engaging the locking channel so as to securably attach the solar panel cap to the fixed coping. An angle of the solar panel cap is adjustably positionable relative to the top of the parapet or wall.

The upper extension may generally comprise a vertical wall, a triangular cross-section, or a rectangular cross-section. The secured bracket preferably includes an attachment means configured to attach the secured bracket to the parapet or wall. The attachment means may comprise adhesive, screws, nails, bolts, rivets, or spring biasing as from the lower extensions pressing inwards on the sides of the wall. Where the secured bracket comprises two separate components, there are preferably two edge secured brackets, each configured to rest flush against one of two oppositely disposed top edges of the parapet or wall.

When the fixed coping is attached to the secured bracket, the same form a wire channel therebetween. The wire channel is defined by the fixed coping on a first side, a secured bracket on a second side, the upper extension on a third side and the locking channel on a fourth side.

The system may further comprise an electrically powered device electrically connected to the solar panel. The electrically powered device may comprise a street light, a building light, a battery, or an outdoor electrical device. The electrically powered device may also comprise a light cap attachable to the locking channel on the fixed coping by a locking insert on the light cap.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 5 is a view similar to FIG. 4, now showing adjustability of the panel downward;

FIG. 6 is a view similar to FIG. 5, now showing adjustability of the panel upward;

FIG. 7 is a view similar to FIG. 5, now showing adjustability of the panel downward;

FIG. 11 is a front perspective view of the embodiment similar to FIG. 2 with a parapet support;

FIG. 12 is a back perspective view of the embodiment of FIG. 11;

FIG. 13 is a rear perspective view of FIG. 12, now showing adjustability of the panel downward;

FIG. 14 is a sectional view taken along line 14-14 of FIG. 11;

FIG. 15 is another sectional view similar to FIG. 14, now with the panel lowered;

FIG. 16 is another sectional view similar to FIG. 14, now with the panel lowered even further;

FIG. 20 is a front perspective view of an alternate embodiment that combines features of the embodiments shown in FIGS. 11-16 with the features of FIGS. 17-19;

FIG. 21 is a rear perspective view of the embodiment of FIG. 20;

FIG. 22 is a rear perspective view of FIG. 21, now showing adjustability of the panel downward;

FIG. 23 is a sectional view taken along line 23-23 of FIG. 20;

FIG. 24 is another sectional view similar to FIG. 23, now with the panel lowered;

FIG. 25 is another sectional view similar to FIG. 23, now with the panel lowered even further;

FIG. 28 shows a rolled metal forming machine for forming a seamless coping;

FIG. 29 shows a cross-sectional view of the formed metal coping along line 29-29 of FIG. 28;

FIG. 30 is a close-up view of forming rollers in the machine of FIG. 28;

DETAILED DESCRIPTION OF THE PREFERRED EMBODIMENTS

Figure 1:
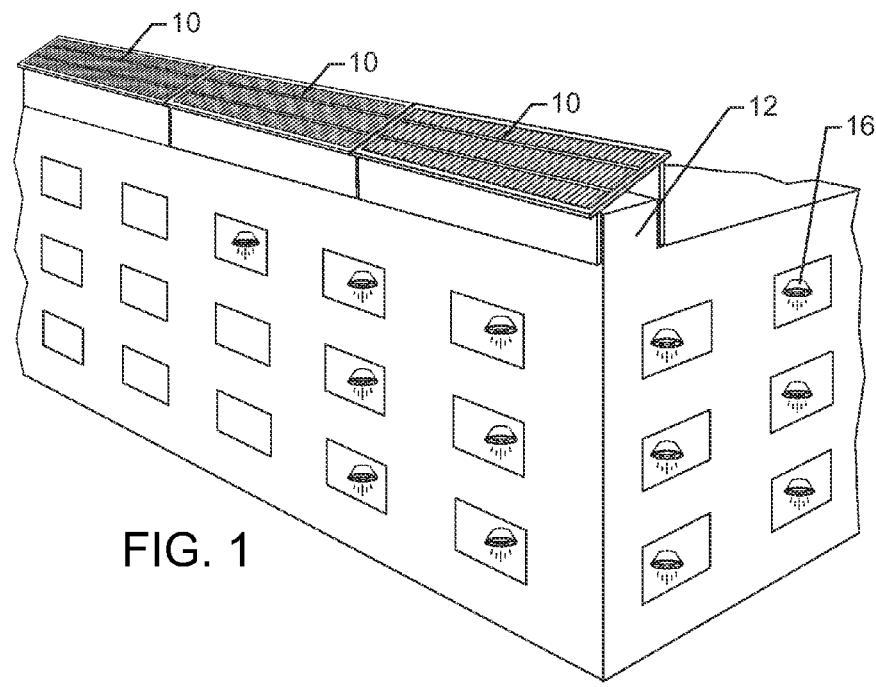
FIG. 1 is a perspective view of an exemplary adjustable solar panel cap embodying the present invention installed on a building's parapet.
Figure 2:
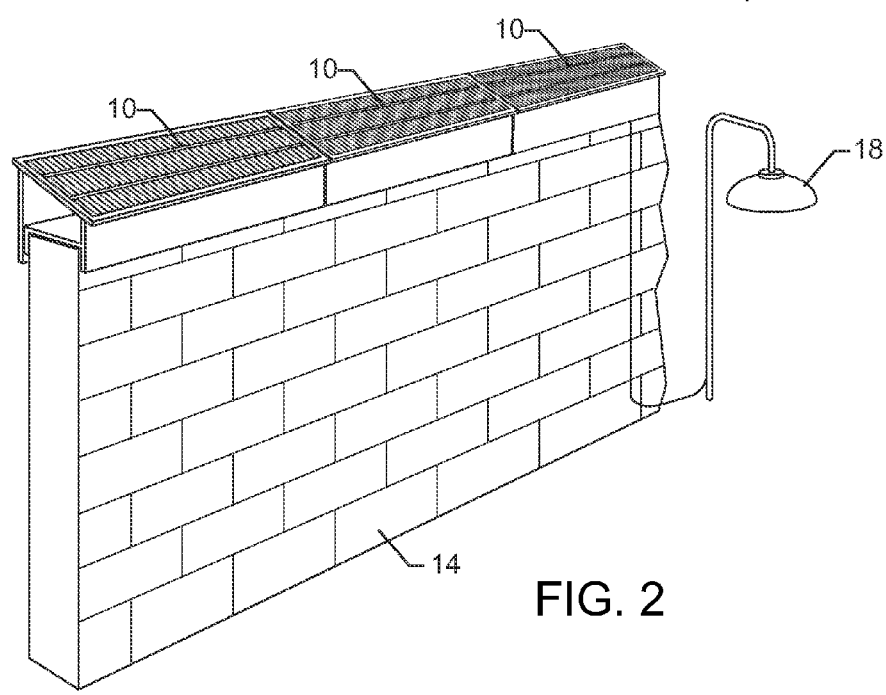
FIG. 2 is a perspective view of another exemplary adjustable solar panel cap embodying the present invention installed on a retention wall.
Figure 3:
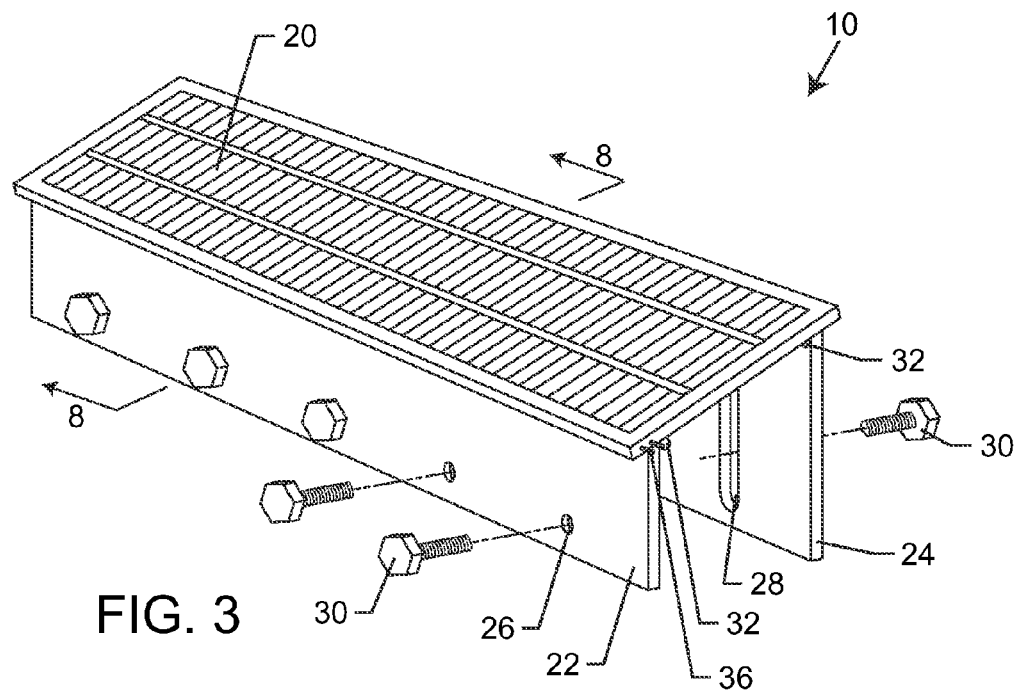
FIG. 3 is a front perspective view of the embodiment similar to FIG. 1.

As shown in the drawings for purposes of illustration, the present invention for an adjustable solar panel cap is referred to generally by the reference number 10. FIG. 1 is a perspective view of an exemplary adjustable solar panel cap 10 embodying the present invention installed on a building's parapet 12. FIG. 2 is a perspective view of another exemplary adjustable solar panel cap 10 embodying the present invention installed on a retention or free-standing wall 14. In FIG. 1, the solar panel cap 10 is configured to produce electricity for the building's lights 16. In FIG. 2, the solar panel cap 10 is configured to produce electricity for the street light 18. It is to be understood by one skilled in the art that the solar panel cap 10 can produce electricity for a variety of electronic devices and is not to be limited to the precise forms shown and described herein.

FIGS. 1 and 2 both show three sets of solar panel caps 10 installed. It is to be understood that each solar panel cap 10 can be electrically coupled to an adjacent solar panel cap 10 such that each individual solar panel cap 10 works together as a single unit. This allows additional solar panel caps 10 to be installed and simply connected to the adjacent solar panel cap 10. In this way, a long stretch of parapet 12 or wall 14 can be fully utilized to produce electricity.

FIGS. 3-10 show an exemplary adjustable solar panel cap 10 embodying the present invention. Due to the solar panel caps 10 being installed in various high risk locations, it is critical that they do not fall or blow off in the wind. For instance, placing a device onto a parapet 12 is extremely dangerous if the parapet 12 or the device falls to the ground below. This means that people can be seriously injured or even killed. Also, if the solar panel cap 10 is located along a sound barrier adjacent to a highway, it is critical that the solar panel cap 10 remain in place in spite of harsh weather conditions or else the solar panel cap 10 can fall into traffic and create a serious wreck and injury.

Figure 4:
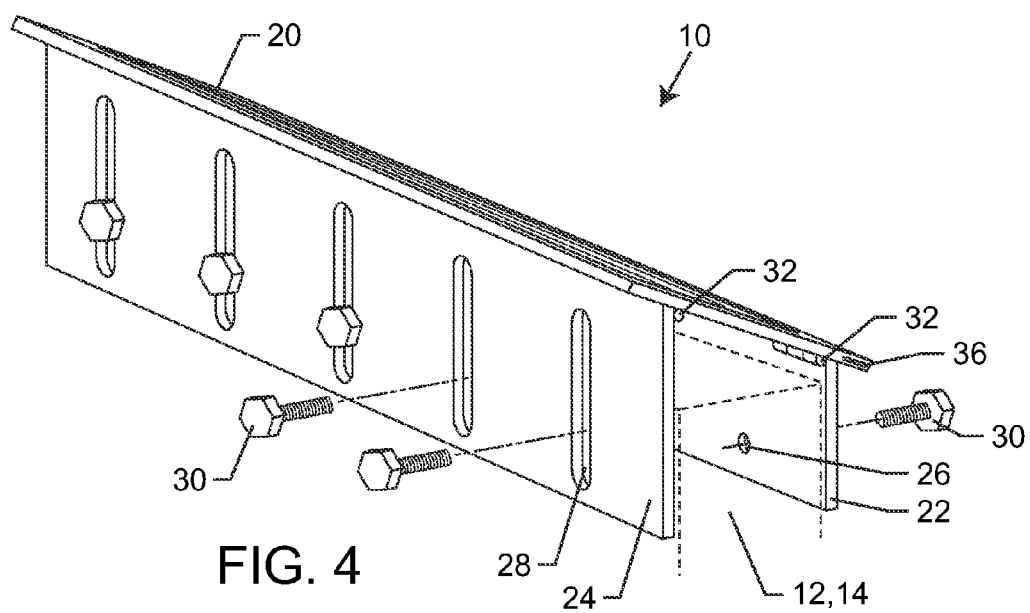
FIG. 4 is a rear perspective view of the embodiment of FIG. 3.
Figure 8:
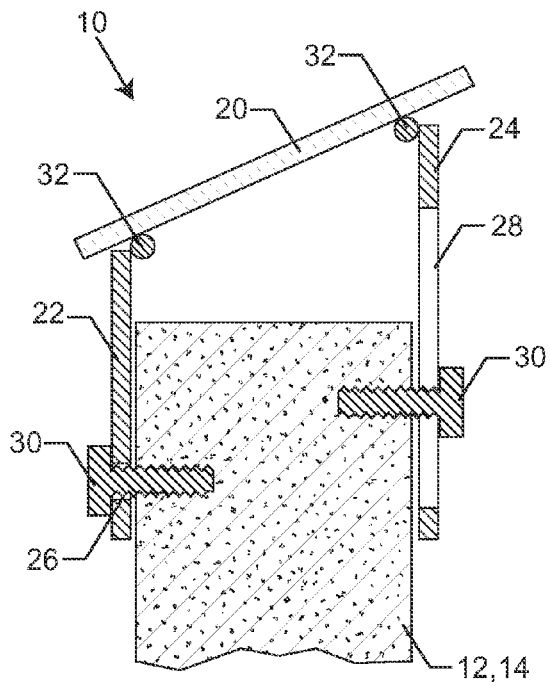
FIG. 8 is a sectional view taken along line 8-8 from FIG. 3, showing the configuration of parts in FIG. 6.
Figure 9:
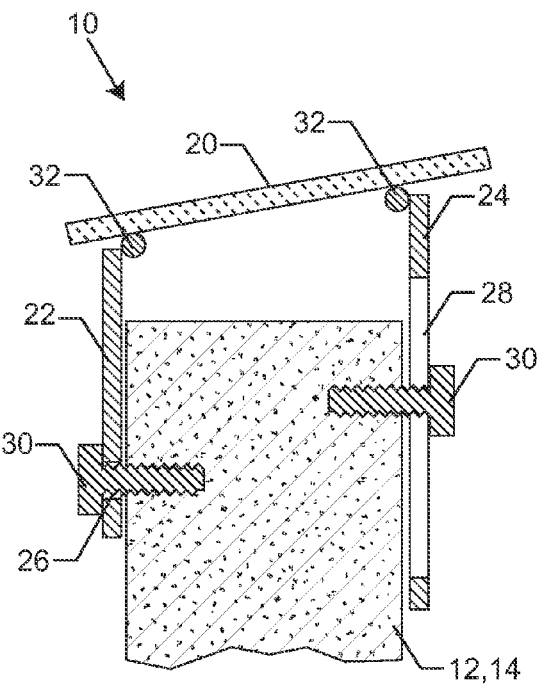
FIG. 9 is similar to FIG. 8, illustrating the configuration also shown in FIG. 5.
Figure 10:
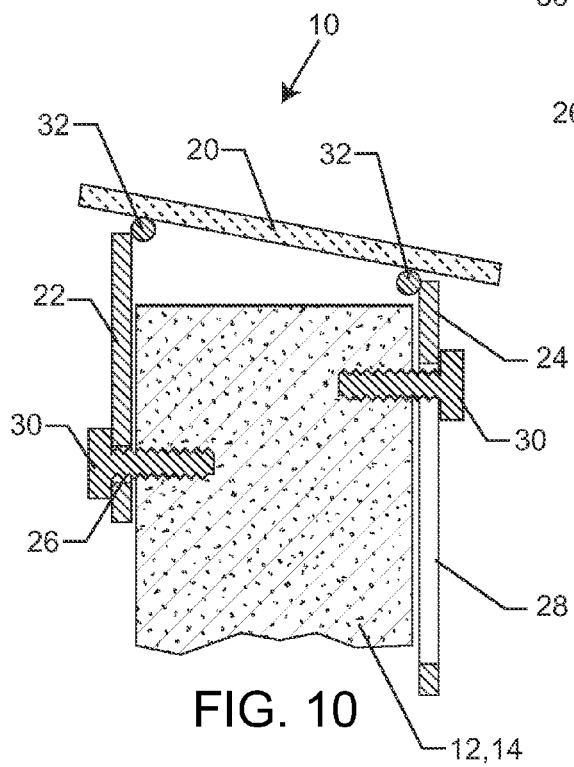
FIG. 10 is a sectional view similar to FIGS. 8 and 9, illustrating the configuration also shown in FIG. 7.

The adjustable solar panel cap 10 includes a solar panel section 20 which is pivotably connected to two sides; a fixed mount 22 and a slidable mount 24. Within the fixed mount 22 are holes 26 and within the slidable mount 24 are slots 28. Both the fixed mount 22 and slidable mount 24 are pivotably connected to the solar panel section 20 at hinges 32. As shown in FIG. 4, the solar panel cap 10 is placed over a parapet 12 or wall 14. A screw 30 is then fed through the hole 26 in the fixed mount side and attached permanently to the parapet/wall 12, 14. Now a second screw 30 may be fed through the slot 28 of the slidable mount 24.

The slidable mount 24 is able to move up and down relative to the parapet/wall 12, 14. This then changes the angle of the solar panel section 20 as best shown in FIGS. 5-10. Once a desired angle of the solar panel section 20 is achieved, the screws may be tightened thereby permanently securing the angle. The present invention allows the angle of the solar panel section 20 to be adjustable as setting an optimum angle produces the most amount of electricity. Depending on the climate of the parapet 12 or wall 14, and depending on the exact configuration of the parapet 12 or wall, adjustability of the solar panel section 20 is critical to optimizing the electricity produced.

FIGS. 11-16 show another exemplary embodiment of an adjustable solar panel cap 10. Now the fixed mount 22 includes a horizontal support 34 that is designed to fit over and capture a parapet 12 or wall 14. The support 34 is designed to be placed on a parapet 12 or wall 14 and not fall over or require a set of hands to hold it in place while it is being secured. Before a single screw 30 is fastened, the solar panel cap 10 can be placed upon the parapet 12 or wall 14 without the use of additional hands or supports to hold it in place. This effectively simplifies the installation process as a single worker can now install each individual screw 30 at their discretion.

The embodiment of FIGS. 11-16 is easier to install as compared to the embodiment of FIGS. 3-10. However, each embodiment includes a fixed mount 22 and a slidable mount 24 such that the solar panel section 20 can be adjusted before it is fastened into a permanent position. In the embodiment of FIGS. 11-16, the slidable mount 24 is now comprised of a plurality of holes 26 such that height can be adjusted by selecting various holes 26. It is to be understood by one skilled in the art that a slot 28 can also be used.

Various figures also show how each solar panel cap 10 can include an adjacent electrical connector 36 such that adjacent panels can be connected in series. This can ease installation and also generate a significant amount of energy when multiple solar caps 10 are used. Also, a battery can be electrically coupled to the solar panel cap 10 such that energy can be gathered and stored during daylight hours and then used later during the night.

Figure 17:
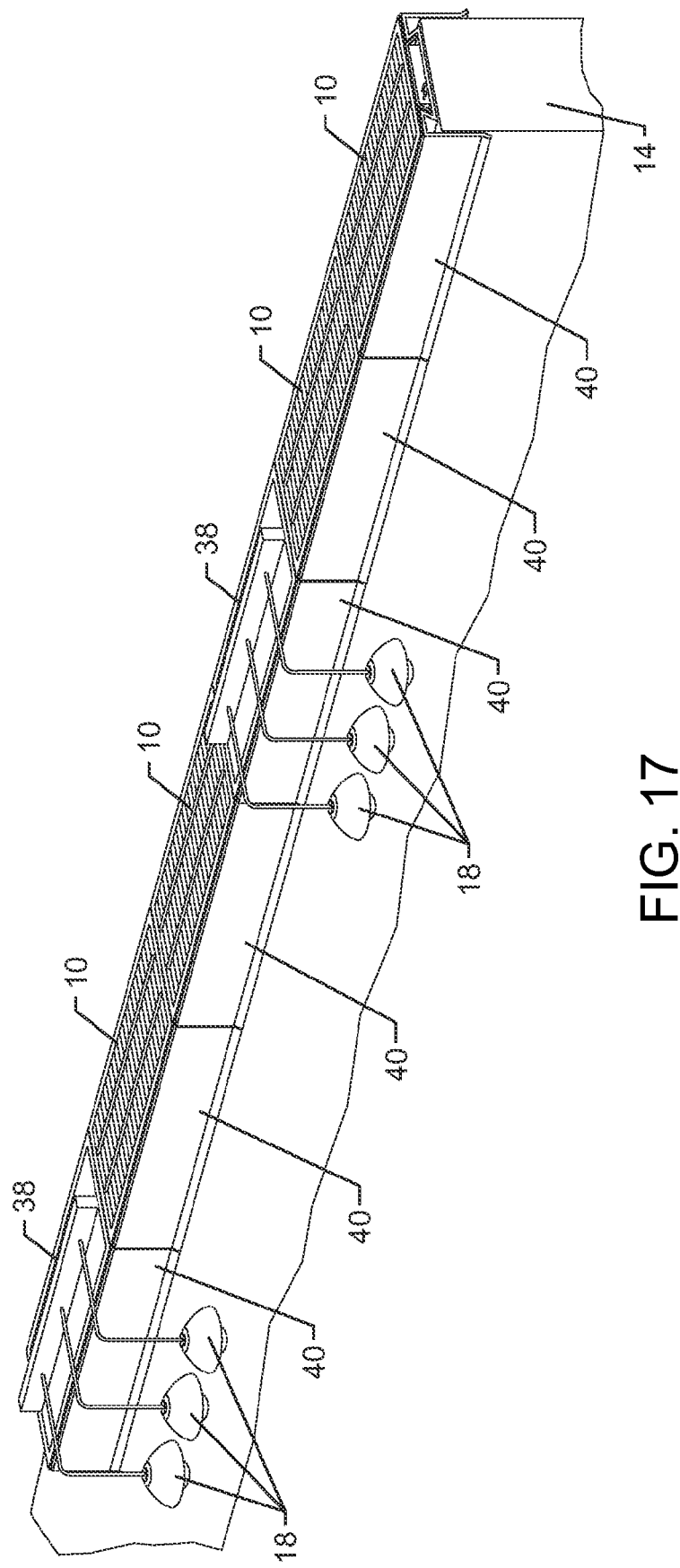
FIG. 17 is a perspective view of an exemplary plurality of solar panel caps and light caps embodying the present invention installed on a retention wall.
Figure 18:
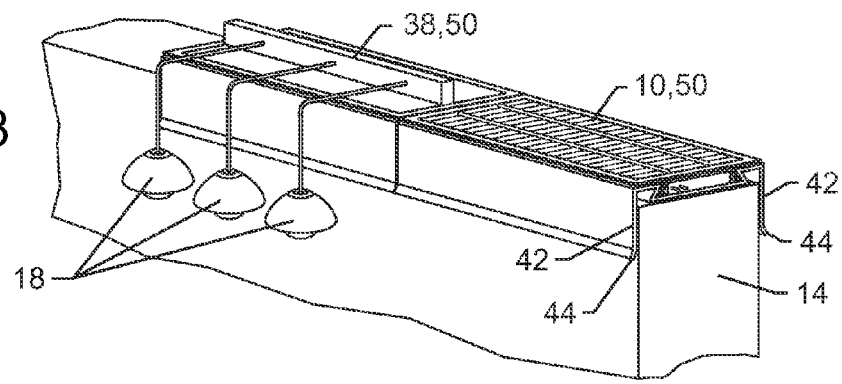
FIG. 18 is a perspective view similar to the structure of FIG. 17, now showing a single solar panel cap and light cap.
Figure 19:
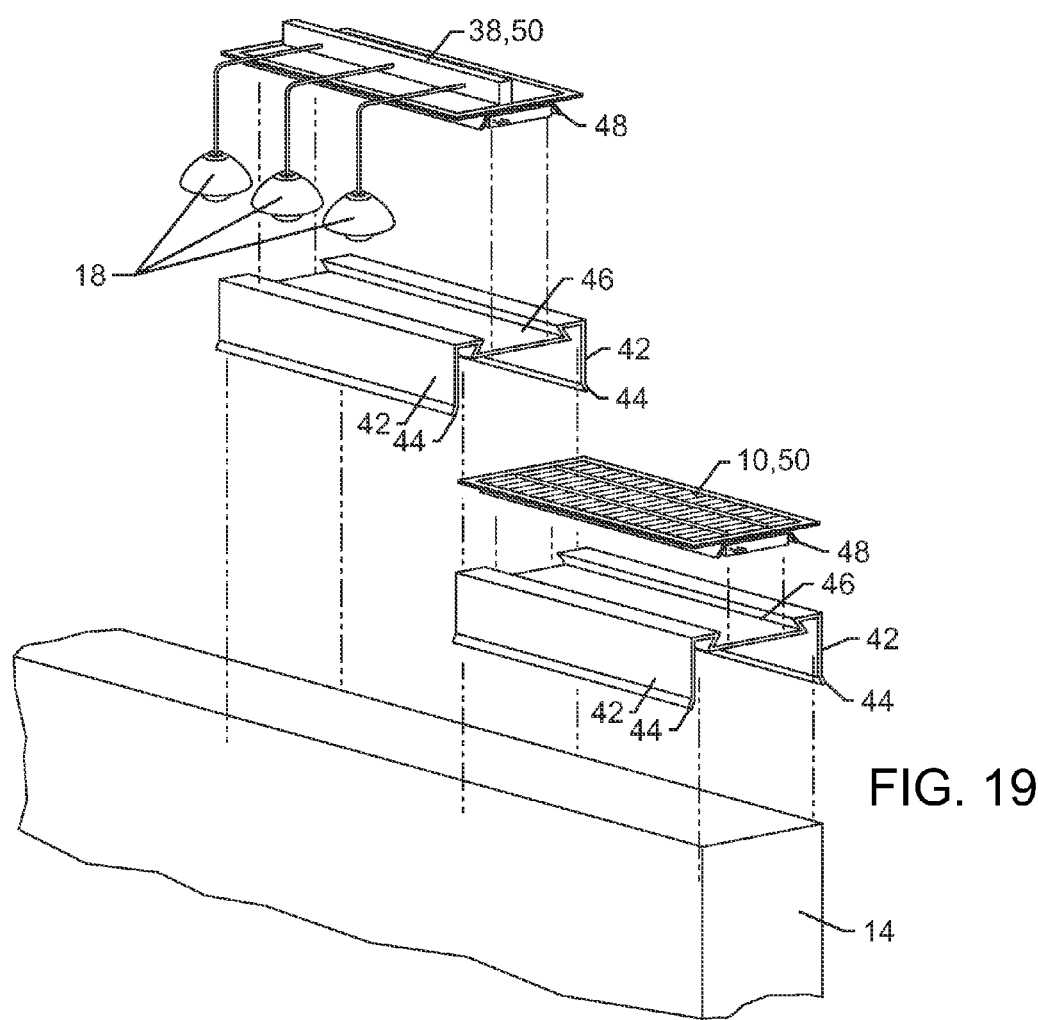
FIG. 19 is an exploded view of the structure of the FIG. 18.

FIG. 17 is a perspective view of another exemplary plurality of solar panel caps 10 and light caps 38 embodying the present invention installed on a wall 14. FIG. 18 is a perspective view similar to the structure of FIG. 17 now showing a single solar panel cap 10 and light cap 38. FIG. 19 is an exploded view of the structure of the FIG. 18.

FIGS. 17-19 illustrate another method of easily attaching a multitude of solar panel caps 10 and light caps 38 such that installation is extremely easy and quick. Due to the solar panel caps 10 being installed in various high risk locations, it is critical that they do not fall or blow off in the wind. For instance, placing a device onto a parapet 12 is extremely dangerous if the parapet 12 or the device falls to the ground below. This means that people can be seriously injured or even killed. Also, if the solar panel cap 10 is located along a sound barrier adjacent to a highway, it is critical that the solar panel cap 10 remain in place in spite of harsh weather conditions or else the solar panel cap 10 can fall into traffic and create a serious wreck and injury. However, it is also desired that installation can be accomplished quickly without the need to drill holes and use bolts and nuts to securely fasten the devices. Also, it is desired that unskilled labor can be used and the design is free from possible installation errors.

To accomplish these goals, a common bracket 40 is used to attach both the solar panel caps 10 and light caps 38. In an exemplary embodiment the bracket 40 may be designed to fit snuggly over a wall 14 by the use of two vertical extensions 42. The vertical extensions 42 extend well below the center of the bracket 40 and run along the entire longitudinal length of the bracket 40. The bracket 40 can be made of a resilient material, such as metal, which therefore allows the extensions 42 to act as springs. This is accomplished by making the distal ends 44 of the extensions 42 slightly smaller than the wall 14 it is being installed on. When the bracket 40 is forced upon a wall 14, the material of the bracket 40 will bend at the juncture between the extension arm 42 and the center of the bracket 40.

To also keep the bracket 40 installed along the wall 14, the extensions 42 must be sufficiently long such that they prevent the bracket 40 from being blown off or falling off. The longer the extensions 42, the harder it will be for the bracket 40 to fall off the wall 14. As discussed in previous embodiments, fastening means may also be used to permanently attach the brackets 40 to the wall 14.

Each bracket has a center section which includes a locking channel 46. The locking channel 46 is designed to securely retain a matching corresponding end 48. The end 48 is designed to slip within the channel 46 from the side. Once the end 48 is within the channel 46, the end 48 cannot separate from the channel 46 in the vertical direction.

Both the solar panel cap 10 and light cap 38 have the matching end 48 along their bottom surface. This means that either the solar panel cap 10 or light cap 38 can be used with the common bracket 40. Having a common bracket 40 for both the solar panel cap 10 and light cap 38 aides in the ease of installation and reduces overall costs.

It is to be understood that each solar panel cap 10 can be electrically coupled to an adjacent solar panel cap 10 or light cap 38 such that each individual solar panel cap 10 works together with other solar panel caps 10 and light caps 38 as a single unit. This allows additional solar panel caps 10 and light caps 38 to be installed and simply connected to an adjacent cap 10, 38. In this way, a long stretch of parapet 12 or wall 14 can be fully utilized to produce electricity.

It is to also be understood by one skilled in the art that each light cap 38 may include a multitude of street lights 18. Furthermore, either the solar panel cap 10 or light cap 38 may include a rechargeable battery 50 that stores energy collected during daylight hours to then be used during the night.

FIGS. 20-25 show another exemplary embodiment of an adjustable solar cap 10. This particular embodiment is essentially a combination of the embodiment shown in FIGS. 11-16 incorporated with the structure shown in FIGS. 17-19. In this regard, the fixed mount 22 includes a horizontal support 34 that is designed to fit over and capture a parapet 12 or wall 14. As was the case in the embodiment of FIGS. 11-16, this effectively simplifies the installation process as a single worker can now install each individual screw 30.

In the embodiment of FIGS. 20-25, the common bracket 40 includes a locking channel 46 and is attachable to the fixed mount 22 and slidable mount 24 by means of hinges 32. In this manner, the angle of the solar panel may be adjusted by selecting the position of the slidable mount relative to the horizontal support 34, all in much the same manner as the embodiment of FIGS. 11-16.

Of course, each solar panel can include an adjacent electrical connector 36 such that adjacent panels can be connected in series. As in other embodiments, this can ease installation and also generate a significant amount of energy when multiple solar caps 10 are used. Further, a battery can be electrically coupled to the solar panel cap 10 such that energy can be gathered and stored during daylight hours and then used later during the night.

Figure 26:
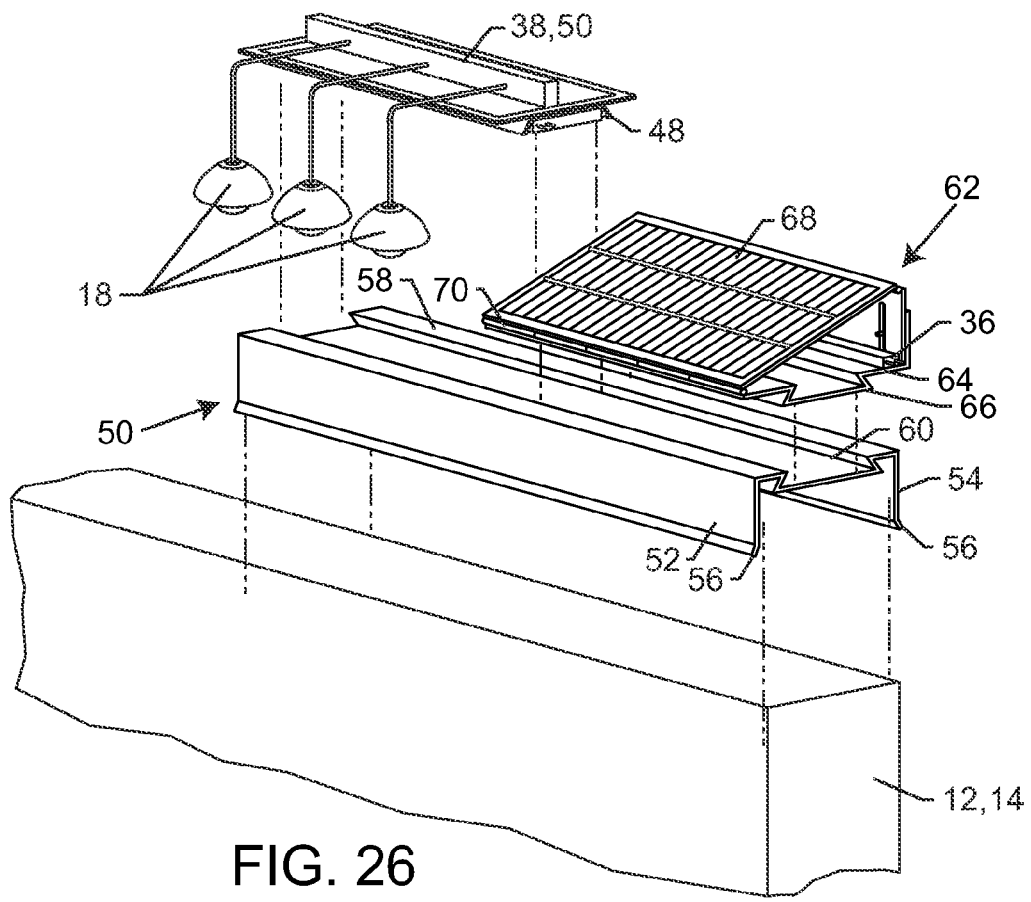
FIG. 26 is an exploded perspective view of an alternate embodiment of the solar panel caps and light caps of the present invention.
Figure 27:
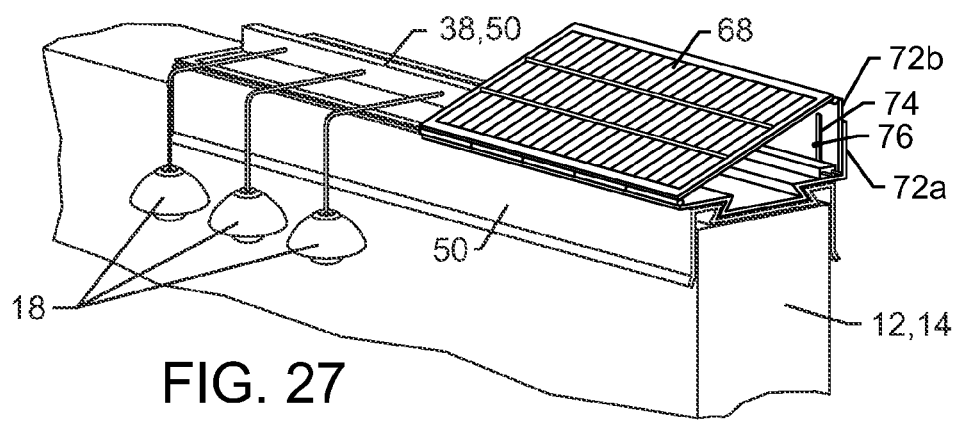
FIG. 27 is an assembled perspective view of the structure of FIG. 26.

FIGS. 26 and 27 illustrate an alternate embodiment of the solar panel caps and coping or solar panel system. Whereas FIGS. 17-25 illustrated a configuration where the solar panel cap 10 was of a fixed configuration and the coping or bracket 40 was of adjustable configuration, the embodiment of FIGS. 26 and 27 reverses this feature.

The fixed coping 50 has a generally rectangular cross-section configured to fit over the top of a parapet 12 or wall 40. The fixed coping 50 has a first vertical support 52 and a second vertical support 54 disposed on opposite sides. Each vertical support 52, 54 preferably includes a flared tail 56 such that the coping 50 may be more easily slipped over the top of the parapet 12 or wall 14. The vertical supports 52, 54 are configured so as to fit over and capture or grab the parapet 12 or wall 14 as by a resilient or biasing force.

An upper horizontal surface 58 connects the vertical supports 52, 54 and includes a locking channel 60 configured similar to the locking channel 46 described above. The vertical supports 52, 54 are permanently and fixedly connected to opposite edges of the horizontal surface 58 so as to be generally permanently configured in the manner described. Preferably, the vertical supports 52, 54 extend sufficiently down either side of the parapet 12 or wall 14 so as to ensure a secure attachment of the coping 50 thereto.

The solar panel cap 62 preferably has a generally triangular cross-section having a lower horizontal base 64. The horizontal base 64 includes a locking insert 66 configured to be slidably received within the locking channel 60 of the coping 50. The locking insert 66 and locking channel 60 are configured to function as the locking channel 46 and end 48 described above.

The solar panel cap 62 further includes an angled solar panel 68 that is pivotally attached to an edge of the lower horizontal base 64 by a hinge 70 or similarly resilient structure. Various hinges may be used, including barrel hinges, pivot hinges, butt/mortise hinges, continuous hinges, strap hinges, or any other type of hinge commonly used in the art. The opposite side edges of the horizontal base 64 and angled solar panel 68 each have a support plate 72A, 72B pivotally attached thereto by a hinge 70 or similarly resilient structure.

The support plates 72A, 72B are configured to cooperatively support one side of the angled solar panel 68 a set distance above the horizontal base 64. Preferably, the support plates 72A, 72B have mating connection mechanisms for securing them together such as a series of overlapping holes 74 configured to be engageable in a plurality of positions. A set pin or screw 76 may be inserted in one or more of the holes 74 so as to lock the solar panel 68 at a predetermined angle above the horizontal base 64. The mating connection mechanisms may come in other forms including brackets and/or channels to receive part of the other support plate or a ridge attached thereupon. The mating connection mechanisms may also comprise magnets or other similar connection devices known in the art. In this way, the angle of the solar panel may be adjusted relative to the position of the sun. As with the earlier embodiments, the solar panel cap 62 includes an electrical connector 36 to connect with adjacent panels or light caps.

FIG. 28 illustrates a rolled metal forming machine 80 typically used to shape and fold flat metal into desired configurations. The machine 80 uses a roll of flat stock material 82, usually light gage steel or aluminum. A pair of drive rollers 84 feed the roll of material 82 through the machine 80. The drive rollers 84 are preferably driven by a motor 86. The machine 80 includes guide rollers 88 and a sensor 90 to measure the length of material 82 passing through the machine 80. The machine 80 further includes a cutting mechanism 92 configured for creating the desired profile on the end of a piece of material 82 to be machined, as well as cut the machined material from the rest of the roll 82 once the desired length is prepared. The cutting mechanism 92 may take the form of a punch and die, a shear, a CNC mill, a laser, or other common cutting method known in the art.

The machine 80 continues with a plurality of forming rollers 94 configured to bend and shape the material from the roll 82 into a desired shape. A person of ordinary skill in the art will appreciate how these forming rollers 94 may be configured to bend the material and achieve the desired shape. FIG. 29 illustrates the bent and shaped coping as it exits the machine 80. Note that it is upside down such that the sides 52, 54 do not interfere with the drive rollers 84.

The lateral spacing of the forming rollers 94 is preferably adjustable such that the width of the formed material can be adjusted across a range. Specifically, in the case of the fixed coping 50 formed by the machine 80, the forming rollers 94 can be adjusted such that the horizontal surface 58 can cover a range of widths, such as from four inches to sixteen inches or more depending upon the width of the parapet 12 or wall 14. As illustrated in FIG. 30, the adjustment of the forming rollers 94 may be achieved by releasably sliding the pairs of forming rollers 94 along a set or guide rod 96. One or both pairs of forming rollers 94 on each guide rod 96 may be slidably adjustable and fixed in position as by set screw, locking pin or similar mechanism 98. The set screw 98 allows for more fine tuning in the selection of a desired width.

Continuous operation of the machine 80 allows for the creation of a fixed coping 50 having an indeterminate length so as to provide a continuous coping 50 along an entire length of the parapet 12 or wall 14. Such a continuous length of coping 50 provides for greater stability and fixed attachment to the parapet 12 or wall 14. One need only operate the cutting mechanism 92 once the desired length has been measured by the length sensor 90. Such a method provides for a seamless coping 50 to be attached to the parapet 12 or wall 14.

Figure 31:
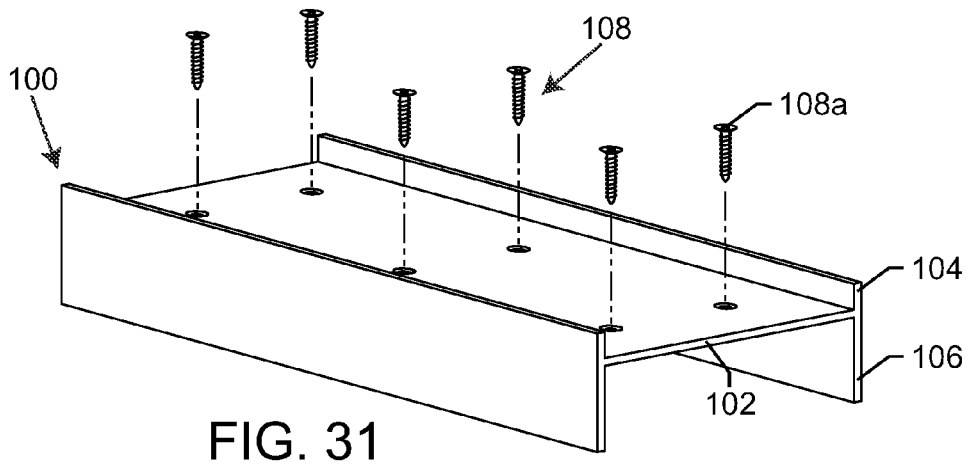
FIG. 31 is a perspective view of a secured bracket of the present invention.
Figure 32:
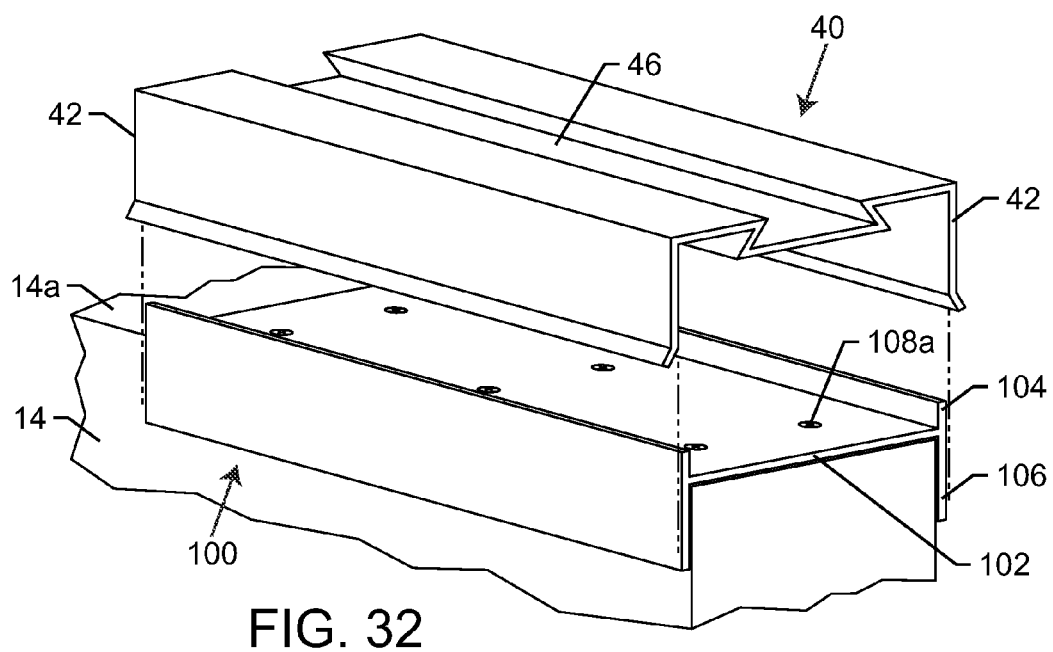
FIG. 32 is a partial exploded environmental perspective view of a secured bracket and fixed coping attached to a parapet or wall.
Figure 33:
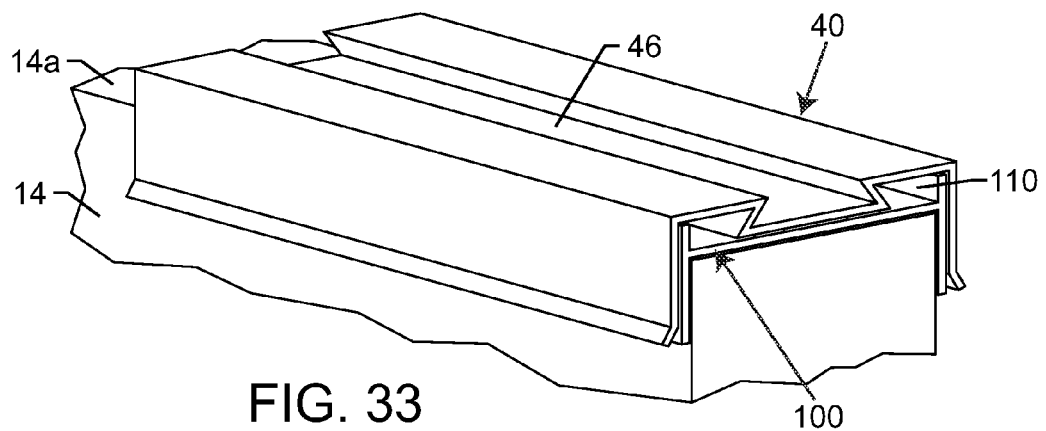
FIG. 33 is a partial environmental perspective view of a secured bracket and fixed coping attached to the top of the parapet or wall.

FIGS. 31-41 illustrate various alternate embodiments of the adjustable solar panel system of the present invention including a secured bracket. FIGS. 31-33 illustrate a first version of this alternate embodiment comprising the fixed coping or common bracket 40 as described above, and a secured bracket 100. The secured bracket 100 comprises a securing plate 102, upper extensions 104, and lower extensions 106. The securing plate 102 is preferably flat or planar and configured to rest flush against a top 14a of the parapet or wall 14. The upper and lower extensions 104, 106 are preferably disposed on each side of the securing plate 102. The lower extensions 106 run down along the side of the wall 14 so as to provide some additional stability to the secured bracket 100 when it is attached to the wall 14. The upper extensions extend above the top of the parapet or wall so as to provide additional support to a common bracket 40 secured thereon. The upper extensions 104 preferably have a height that matches the depth of the locking channel 46 formed in the common bracket 40. This is such that the top of the upper extension 104 reaches the corner of the common bracket 40 where the vertical extension 42 extends therefrom.

The secured bracket 100 preferably includes a mechanism 108 to secure the bracket 100 to the top 14a of the parapet or wall 14. In the illustrated embodiment, the securing mechanism 108 comprises screws 108a. The securing mechanism 108 may also comprise adhesive, nails, bolts, rivets, spring biasing, or any other similar mechanism known in the art by which the bracket 100 can be secured to the top 14a of the parapet or wall 14.

As shown in FIGS. 32 and 33, the common bracket 40 is slipped over the top of the secured bracket 100 such that the top edge of the upper extensions 104 fully engage the upper corners of the common bracket 40 and the underside of the locking channel 46 rests upon the securing plate 102. The configuration of the common bracket 40 and secured bracket 100 create wire channels 110 to permit electrical wires or other components to be securely run between the two brackets 40, 100. These channels 110 allow the wires to be placed in a manner such that they are not exposed or otherwise subjected to potential damage.

The fact that the common bracket 40 is placed on top of the secured bracket 100 the securing mechanism 108 is covered by the common bracket 40. This ensures that the securing mechanism 108, whether screws, nails, bolts, rivets or similar mechanisms are not exposed and do not present a potential hindrance to a solar panel cap 10 or similar element that might be inserted into the locking channel 46. Without the secured bracket 100, if the common bracket 40 had been secured by screws or similar structure to the top 14a of the wall 14 the same would have likely been in the bottom of the locking channel 46 and potentially prevent a locking insert or corresponding end 48 from being easily inserted therein. The use of the secured bracket 100 provides additional stability and security to the attachment of the solar panel system to the parapet or wall 14.

Figure 34:
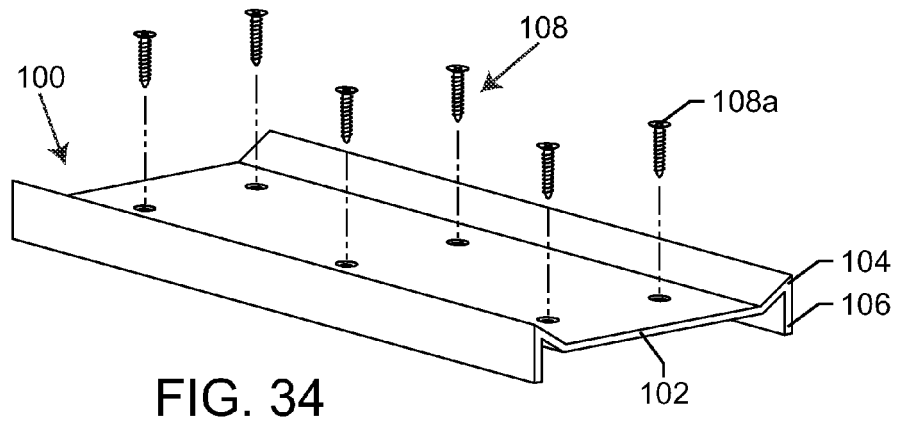
FIG. 34 is a perspective view of an alternate embodiment secured bracket of the present invention.
Figure 35:
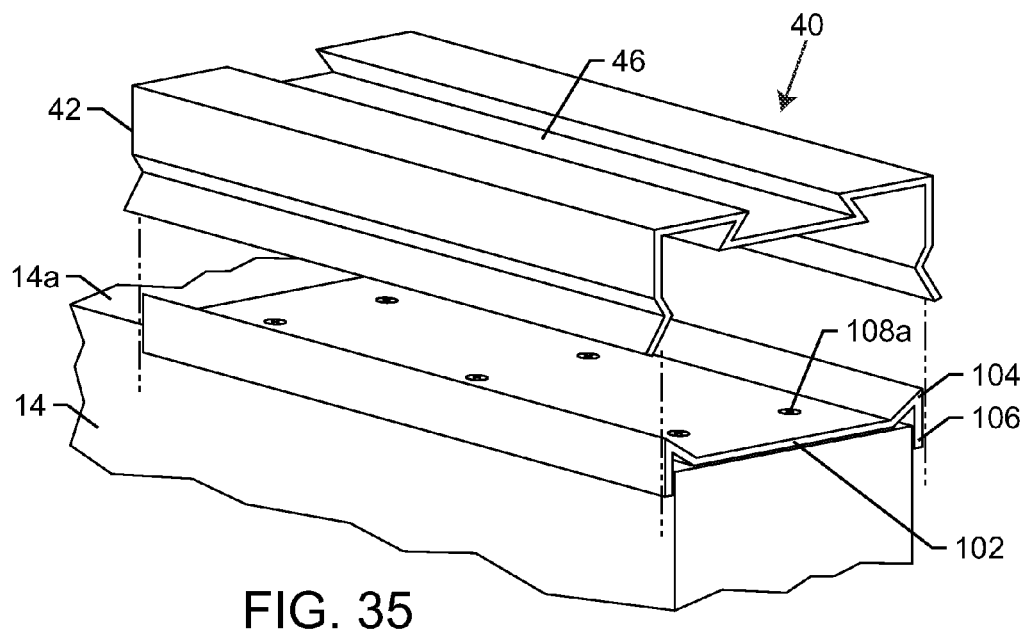
FIG. 35 is a partial exploded environmental perspective view of an alternate embodiment secured bracket and fixed coping attached to a parapet or wall.
Figure 36:
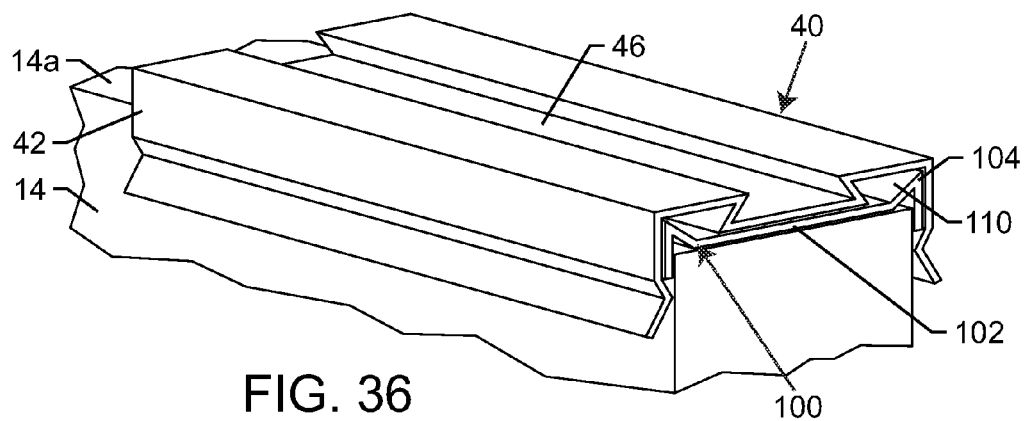
FIG. 36 is a partial environmental perspective view of an alternate embodiment secured bracket and fixed coping attached to the top of the parapet or wall.

FIGS. 34-36 illustrate alternate embodiments similar to that illustrated and described in FIGS. 31-33. In this embodiment, the secured bracket 100 is slightly modified in that the upper extension 104 has a generally triangular shape that extends upwards from the top 14a of the wall 14 before reaching the edge thereof. The lower extension still extends downward below the top 14a of the wall 14 albeit not as much as the earlier embodiment. However, the lower extension 106 may be extended longer as needed. Where the lower extension 106 is shorter, the distal ends 44 of the vertical extensions 42 on the common bracket 40 may be bent inward so as to more securely grasp the lower end of the lower extension 106. This will result in a more secure attachment of the common bracket 40 to the secured bracket 100. The triangular cross-section of the upper extension 104 slightly changes the shape of the wire channel 100 but still allows sufficient room for wires or other components to be run therethrough.

Figure 37:
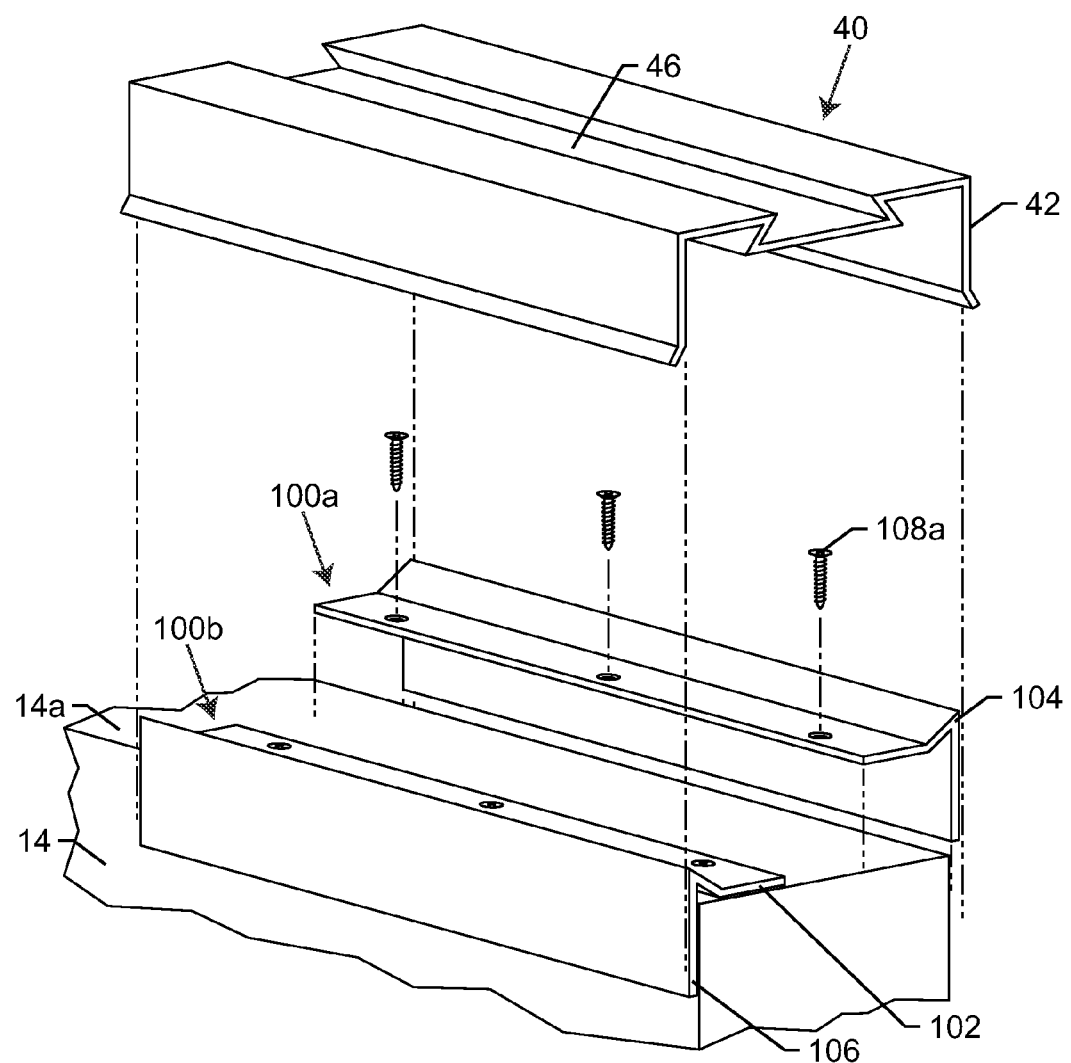
FIG. 37 is a partial exploded environmental perspective view of another alternate embodiment secured bracket and fixed coping attached to a parapet or wall.

FIG. 37 illustrates yet another alternate embodiment wherein the secured bracket 100 comprises two separate mirror image parts 100a, 100b configured for attachment to opposite corners of the top 14a of the wall 14. The securing plate 102 is shorter on each mirror image component 100a, 100b such that it does not extend all the way across the top 14a of the wall 14. In this way, the secured bracket 100 can be used on walls of varying thickness without having to specially construct a secured bracket to the width of the wall. Only the common bracket 40 would need to be specially made to accommodate the width of the wall 14. In this embodiment, the secured bracket 100 still allows for the use of securing mechanism 108 and creates the wire channel 110 described above. The bottom surface of the locking channel 46 would mostly cover any gap between the two securing plates 102. This embodiment illustrated in FIG. 37 shows a longer lower extension 106 used on conjunction with the triangular cross-section upper extension 104.

Figure 38:
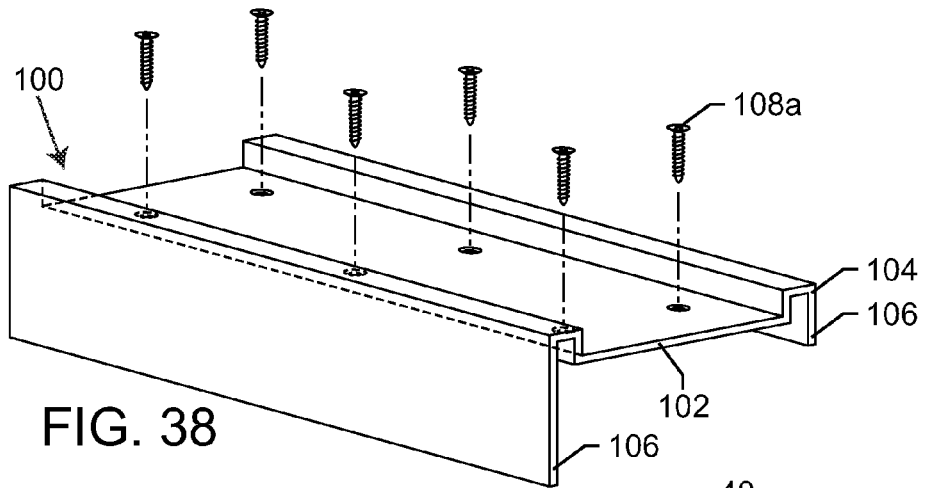
FIG. 38 is a perspective view of yet another alternate embodiment secured bracket of the present invention.
Figure 39:
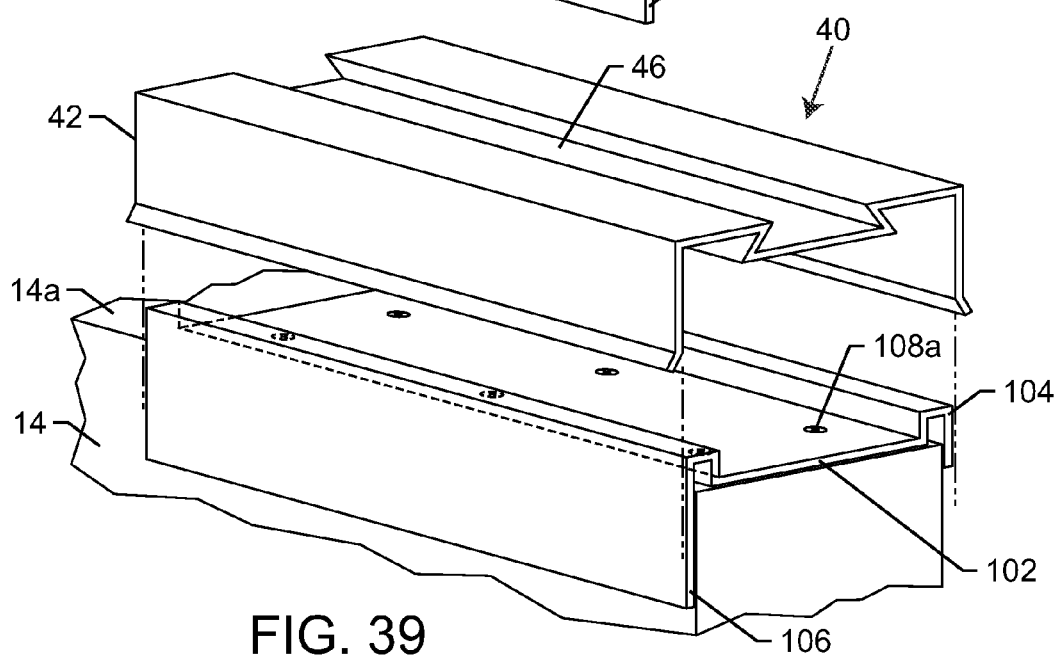
FIG. 39 is a partial exploded environmental perspective view of yet another alternate embodiment secured bracket and fixed coping attached to a parapet or wall.
Figure 40:
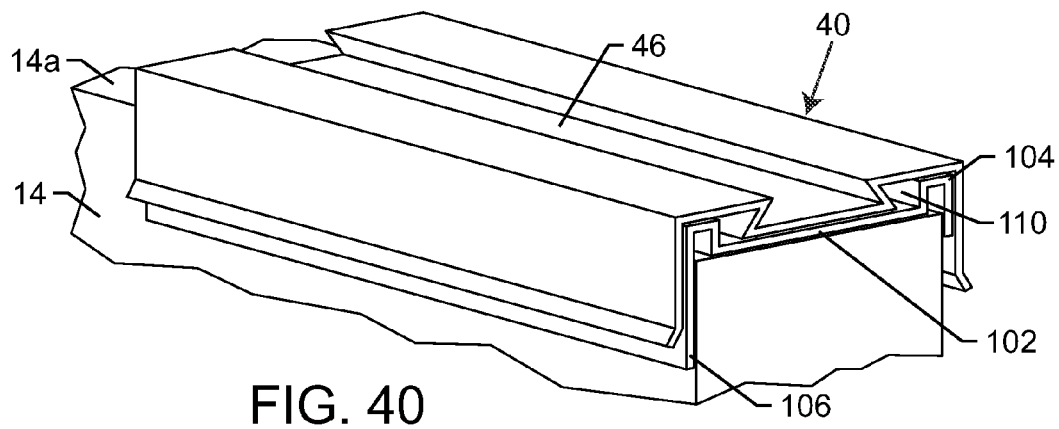
FIG. 40 is a partial environmental perspective view of yet another alternate embodiment secured bracket and fixed coping attached to the top of the parapet or wall.

FIGS. 38-40 illustrate yet another alternate embodiment wherein the upper extension 104 of the secured bracket 100 has a generally square or rectangular cross-section. The same considerations with the upper extension 104 having a triangular cross-section apply to this embodiment having the square cross-section. It is worth noting that the square cross-section provides increased surface area contact between the common bracket 40 and secured bracket 100. The wire channels 110 have an even smaller cross-section but still provide sufficient space for the passage of wires and other structures therethrough. This embodiment of the secured bracket 100 shows a lower extension 106 on one side having a short length and the lower extension 106 on the other side having an extended length. The secured bracket 100 may be installed with both lower extensions 106 having the same length—either long or short—or different lengths. Where the lengths are different the longer lower extension 106 may be installed on an upwind side of the wall 14 to provide additional holding strength against high winds.

Figure 41:
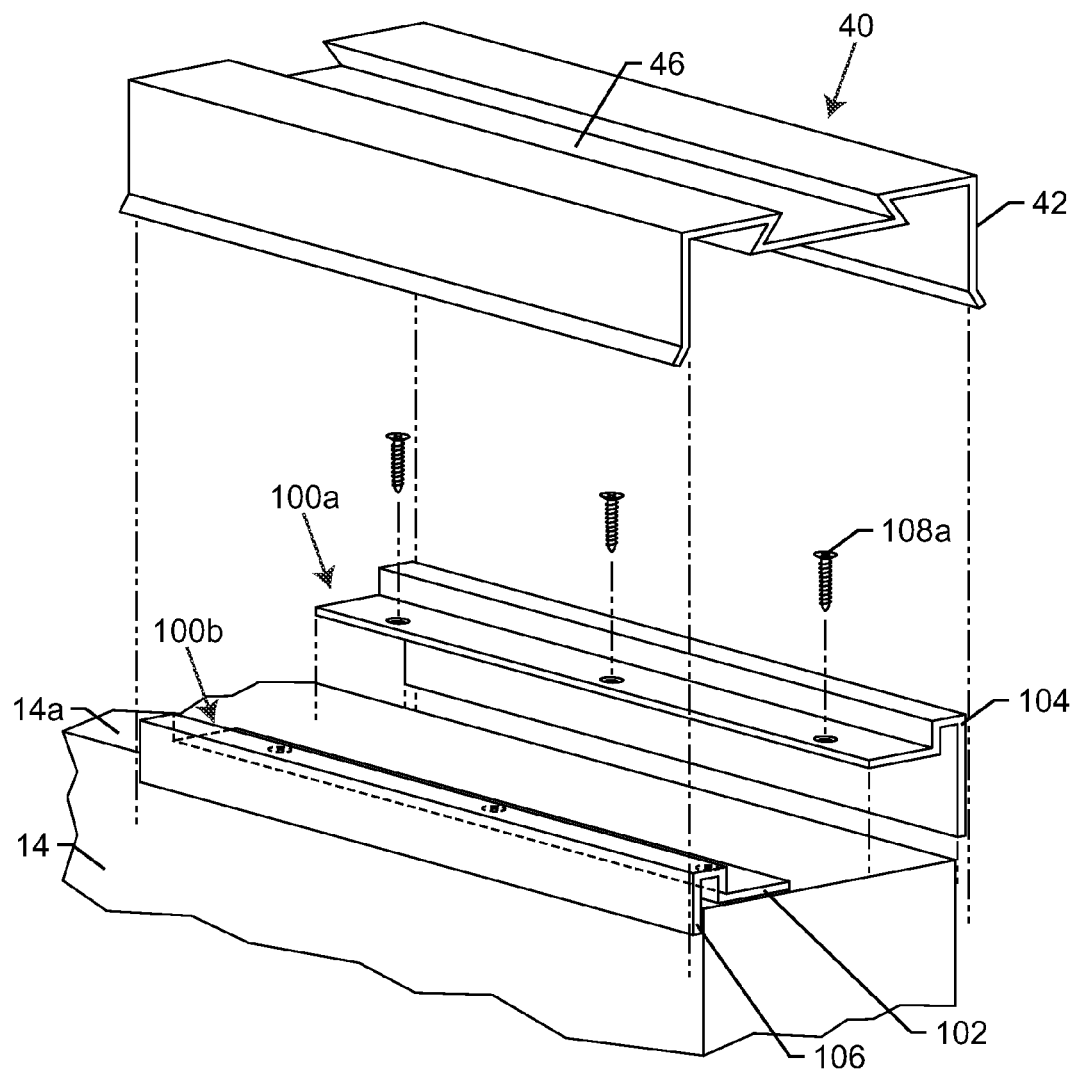
FIG. 41 is a partial exploded environmental perspective view of a further alternate embodiment secured bracket and fixed coping attached to a parapet or wall.

FIG. 41 illustrates an alternate embodiment of the secured bracket 100 with an upper extension 104 having a square cross-section wherein the bracket 100 is divided into mirror image components 100a, 100b. As with the earlier embodiment, the lower extension 106 on one side may be longer than the lower extension 106 on the other side.

Although several embodiments have been described in detail for purposes of illustration, various modifications may be made without departing from the scope and spirit of the invention. Accordingly, the invention is not to be limited, except as by the appended claims.

What is claimed is:

1. An adjustable solar panel system for attachment to a parapet or wall, comprising:
    a secured bracket comprising a securing plate configured to rest flush against a top of the parapet or wall, wherein an edge of the secured bracket includes a upper extension configured to extend above the top of the parapet or wall and a lower extension configured to extend below the top of the parapet or wall;

a fixed coping comprising oppositely disposed vertical supports, the fixed coping configured for attachment to the secured bracket on the top of the parapet or wall such that the pair of vertical supports extend below the lower extension and are biased against sides of the parapet or wall, the fixed coping further having a locking channel on a top thereof; and a solar panel cap configured for attachment to the fixed coping, the solar panel cap having a locking insert for slidably engaging the locking channel of the fixed coping so as to securably attach the solar panel cap to the fixed coping.

2. The solar panel system of claim 1, wherein an angle of the solar panel cap is adjustably positionable relative to the top of the wall or parapet.

3. The solar panel system of claim 1, wherein the upper extension generally comprises a vertical wall, a triangle cross-section, or a square cross-section.

4. The solar panel system of claim 1, further comprising attachment means configured to attach the secured bracket to the parapet or wall.

5. The solar panel system of claim 4, wherein the attachment means comprises adhesive, screws, nails, bolts, rivets, or spring biasing.

6. The solar panel system of claim 1, wherein the secured bracket comprises two edge secured brackets, each configured to rest flush against one of two top edges of the parapet or wall.

7. The solar panel system of claim 1, wherein the secured bracket and fixed coping form a wire channel therebetween.

8. The solar panel system of claim 7, wherein the wire channel is defined by the fixed coping on a first side, the secured bracket on a second side, the upper extension on a third side, and the locking channel on a fourth side.

9. The solar panel system of claim 1, further comprising an electrically powered device electrically connected to the solar panel.

10. The solar panel system of claim 9, wherein the electrically powered devices comprise a streetlight, a building light, a battery or an outdoor electrical device.

11. The solar panel system of claim 10, wherein the electrically powered device comprises a light cap attachable to the locking channel on the fixed coping by a locking insert on the light cap.

12. An adjustable solar panel system for attachment to a parapet or wall, comprising:

a secured bracket comprising a securing plate configured to rest flush against a top of the parapet or wall, wherein an edge of the secured bracket includes a upper extension configured to extend above the top of the parapet or wall and a lower extension configured to extend below the top of the parapet or wall;

attachment means configured to attach the secured bracket to the parapet or wall;

a fixed coping comprising oppositely disposed vertical supports, the fixed coping configured for attachment to the secured bracket on the top of the parapet or wall such that the pair of vertical supports extend below the lower extension and are biased against sides of the parapet or wall, the fixed coping further having a locking channel on a top thereof, wherein the secured bracket and fixed coping form a wire channel therebetween; and a solar panel cap configured for attachment to the fixed coping, the solar panel cap having a locking insert for slidably engaging the locking channel of the fixed coping so as to securably attach the solar panel cap to the fixed coping.

13. The solar panel system of claim 12, wherein an angle of the solar panel cap is adjustably positionable relative to the top of the wall or parapet.

14. The solar panel system of claim 12, wherein the upper extension generally comprises a vertical wall, a triangle cross-section, or a square cross-section.

15. The solar panel system of claim 12, wherein the attachment means comprises adhesive, screws, nails, bolts, rivets, or spring biasing.

16. The solar panel system of claim 12, wherein the secured bracket comprises two edge secured brackets, each configured to rest flush against one of two top edges of the parapet or wall.

17. The solar panel system of claim 12, wherein the wire channel is defined by the fixed coping on a first side, the secured bracket on a second side, the upper extension on a third side, and the locking channel on a fourth side.

18. The solar panel system of claim 12, further comprising an electrically powered device electrically connected to the solar panel.

19. The solar panel system of claim 18, wherein the electrically powered devices comprise a streetlight, a building light, a battery or an outdoor electrical device.

20. The solar panel system of claim 18, wherein the electrically powered device comprises a light cap attachable to the locking channel on the fixed coping by a locking insert on the light cap.

* * * * *